United States Patent [19]

Hitomi et al.

[11] Patent Number: 5,357,936
[45] Date of Patent: Oct. 25, 1994

[54] ENGINE OF A SPARK IGNITION TYPE

[75] Inventors: Mitsuo Hitomi; Shunji Masuda; Toshihiko Hattori; Kenji Kashiyama; Junsou Sasaki, all of Hiroshima, Japan

[73] Assignee: Mazda Motor Corporation, Hiroshima, Japan

[21] Appl. No.: 169,550

[22] Filed: Dec. 20, 1993

Related U.S. Application Data

[63] Continuation of Ser. No. 945,506, Sep. 16, 1992, abandoned.

[30] Foreign Application Priority Data

Sep. 26, 1991 [JP] Japan .................. 3-274596
Sep. 26, 1991 [JP] Japan .................. 3-274598

[51] Int. Cl.⁵ ............................. F02M 25/06
[52] U.S. Cl. ...................... 123/571; 60/605.2
[58] Field of Search .......... 123/568, 569, 570, 571, 123/90.24, 90.15, 90.16, 90.17, 432; 60/605.2

[56] References Cited

U.S. PATENT DOCUMENTS

| | | | |
|---|---|---|---|
| 3,672,340 | 6/1972 | Bomba | 123/570 |
| 3,774,399 | 11/1973 | Nohira et al. | 123/570 |
| 4,106,464 | 8/1978 | Yamashita et al. | 123/571 |
| 4,147,141 | 4/1979 | Nagano | 123/570 |
| 4,356,806 | 11/1982 | Freesh | 123/570 |
| 4,462,376 | 7/1984 | Ripper et al. | 123/571 |
| 4,530,318 | 7/1985 | Semple | 123/90.24 |
| 4,683,863 | 8/1987 | Sugiura | 123/568 |
| 4,702,218 | 10/1987 | Yoshioka et al. | 60/605.2 |

FOREIGN PATENT DOCUMENTS

| | | |
|---|---|---|
| 59-160052 | 9/1984 | Japan . |
| 60-237153 | 11/1985 | Japan . |
| 2-36772 | 8/1990 | Japan . |

Primary Examiner—Tony M. Argenbright
Assistant Examiner—M. Macy
Attorney, Agent, or Firm—Fish & Richardson

[57] ABSTRACT

An internal combustion engine of a spark ignition type is so arranged as to set an air-fuel ratio of a mixed fuel to become substantially stoichiometric in the range of from A/F=13 to A/F=16 at the time of running in a high load region and to recirculate exhaust gases into the intake system. For the internal combustion engine of a natural intake type, the compression ratio is preferably set to 11 or larger; for the internal combustion engine of a supercharging type, the compression ratio is preferably set to 9 or larger. The rate at which the exhaust gases are recirculated is preferably set to be constant or to become larger as the load of the engine becomes larger.

27 Claims, 18 Drawing Sheets

(VALVE TIMING IN REG. I)

(VALVE TIMING IN REG. X)

(VALVE TIMING IN REG. XI)

ENGINE OF A SPARK IGNITION TYPE

This application is a continuation of U.S. application Ser. No. 07/945,506, filed Sep. 16, 1992, now abandoned.

BACKGROUND OF THE INVENTION

1. Field of the Invention

The present invention relates to an engine of a spark ignition type.

2. Description of the Related Art

Recently, there is the increasing tendency that an engine has a fuel injection valve of electronic type as a fuel supply means, which is arranged to be controlled with a control unit, for example, as disclosed in Japanese Patent Publication (kokoku) No. 2-36,772. The engines of this type can offer the advantage that an air-fuel ratio (a ratio of intake air to fuel to be admixed therewith) of a mixed fuel to be charged into the engine can be adjusted with high freedom.

Generally, an amount of a mixed fuel is supplied in such a manner that an air-fuel ratio of the mixed fuel is controlled so as to become stoichiometric ($\lambda=1$ at A/F=14.7) when a running state of the engine exists in a medium load region, on the one hand, and that the air-fuel ratio of the mixed fuel is controlled so as to become rich as high as A/F=13 or less in order to attach much importance to output of the engine, when the running state of the engine exists in a high load region.

It can be noted, however, that making a air-fuel ratio rich in the high load region as in a conventional case suffers from the disadvantage that fuel economy becomes poor. It is thus preferred to control the air-fuel ratio so as to become stoichiometric even in the high load region when the fuel economy is of great account.

When the air-fuel ratio of the mixed fuel is set to become stoichiometric, combustion can be performed smoothly due to the existence of air in proper quantities as the air-fuel ratio of the mixed fuel becomes closer to the stoichiometric air-fuel ratio, this presents problems in that the temperature within the engine is elevated and a heat load becomes too high, for example, at a valve bridge between an intake valve and an exhaust valve.

SUMMARY OF THE INVENTION

Therefore, the object of the present invention is to provide an internal combustion engine of a spark ignition type so adapted as to suppress the temperature within the engine from elevating when an air-fuel ratio of a mixed fuel is controlled so as to become stoichiometric in a state in which a running state of the engine exists in a high load region, in order to attach importance to fuel economy.

In order to achieve the aforesaid object, the present invention consists of an internal combustion engine of a spark ignition type, having a detector means for detecting a running state of the engine, which comprises a control means for controlling an amount of fuel so as to make an air-fuel ratio of a mixed fuel to be charged into the engine to become substantially stoichiometric in a high load region in which the load of the engine detected by the detector means is equal to or larger than a predetermined value, in response to a signal from the detector means; and a recirculation means for recirculating exhaust gases from the engine into an intake system in the high load region, in response to the signal from the detector means.

In accordance with the present invention, the exhaust gases are recirculated (EGR), when the running state of the engine exists in a high load region, so that the temperature of combustion is suppressed from elevating at the time the engine is running in a high load region, due to the existence of inert exhaust gases that have been recirculated (EGR gases), thereby suppressing the temperature within the engine from elevating.

For engines of a natural intake system, it is preferred to make a compression ratio higher. It can be noted herein that conventional engines have a compression ratio of 9 on average. In order to attach importance to fuel economy, when the air-fuel ratio at the time the engine is running in a high load region is set to A/F=14.7 (stoichiometric air-fuel ratio) from A/F=13 for such conventional engines, it is apparent from FIG. 25 that the following may happen:

A1. Torque generated by the engine is lowered by 2%;

A2. The rate at which fuel is consumed is lowered by 10%;

A3. The temperature at the valve bridge is elevated by 4° C.; and

A4. The temperature of exhaust gases is elevated by 35° C.

If the problems of the elevation of the temperature at the valve bridge and the temperature of exhaust gases are sought to be solved by the recirculation of the exhaust gases, it is apparent from FIG. 24 that an EGR rate of approximately 7% is required in order to compete with the temperature of the exhaust gases. It should be noted herein that the exhaust gases having a higher temperature require a large amount of the exhaust gases to be recirculated. If the exhaust gases should be charged at the EGR rate of approximately 7%, however, the amount of fresh air to be charged into the engine should be lowered by approximately 7%, thereby lowering the torque to be generated by the engine additionally by approximately 7%, too. In other words, the total magnitude of the torque to be generated by the engine is lowered by 9%, when the elevation of the temperature within the engine or the elevation of the temperature of the exhaust gases is sought to be suppressed by the recirculation of exhaust gases when the air-fuel ratio is made leaner to A/F=14.7 (stoichiometric air-fuel ratio) from A/F=13 while the compression ratio is kept constant.

On the other hand, when the compression ratio ($\epsilon$) of the engine is elevated from $\epsilon=9$ (a base engine) to, for example, $\epsilon=11$, the following may happen:

B1. The torque generated by the engine is increased by 7%;

B2. The rate at which the fuel is consumed improved by 3%;

B3. The temperature at the valve bridge elevated by approximately 3° C.; and

B4. The temperature of the exhaust gases lowered by 38° C.

Hence, a combination of the first instance (the air-fuel ratio is made leaner as in the example cited hereinabove) with the second instance (the compression ratio is made higher as in the example cited hereinabove) gives the following results:

1. The torque generated by the engine is increased by 5%, as compared with the base engine (when calculated by subtracting A1 from B1 above);

2. The rate at which the fuel is consumed becomes equal to the base engine;
3. The temperature at the valve bridge is elevated by approximately 7° C., as compared with the base engine (when calculated by summing up A3 and B3); and
4. The temperature of the exhaust gases is lowered by 3° C., as compared with the base engine.

From the foregoing results, it will become apparent that what is left yet unsolved among the aforesaid problems which are sought to be solved is the problem with the elevation of the temperature within the engine (for example, the temperature at the valve bridge).

It can be noted herein, however, that, since the present invention is intended to achieve its object by recirculating exhaust gases through the engine, the problem with the elevation of the temperature at the valve bridge by approximately 7° C., as referred to in the item 3 above, can be solved by charging the exhaust gases into the engine so as from the EGR rate to amount to 7.5%, as is found from FIG. 24. When the exhaust gases are recirculated at the EGR rate of 7.5%, the temperature at the valve bridge can be suppressed from elevating by approximately 7° C.

As described hereinabove, the recirculation of the exhaust gases at the EGR rate of 7.5% can suppress the temperature within the engine from elevating, when the air-fuel ratio of the mixed fuel is made leaner. In addition, it does not make the rate of consumption of the mixed fuel worse and it can make the temperature of the exhaust gases lower. It should be noted herein, however, that, although the torque generated by the engine is lowered by 7.5% by recirculating the exhaust gases, the torque generated by the engine is increased by 5% by combining the leaner air-fuel ratio with the higher compression ratio, so that the torque generated by the engine results in a decrease merely as low as 2.5%. On the other hand, when the compression ratio is set to $\epsilon=9$, the torque generated by the engine is lowered by as high as 9%, as described hereinabove.

Although the recirculation of the exhaust gases may cause a decrease in the torque generated by the engine to some extent, the present invention can greatly improve the rate at which the mixed fuel is consumed in a high load region, while suppressing the temperature within the engine from elevating, by combining the leaner air-fuel ratio and the higher compression ratio with the recirculation of the exhaust gases. Further, it can be noted as a matter of course that the recirculation of the exhaust gases can prevent knocking from occurring. In other words, the recirculation of the exhaust gases in a high load region serves as competing with the knocking that is likely to occur when the compression ratio is made higher.

Other objects, features and advantages of the present invention will become apparent in the course of the description of the preferred embodiments, which follows, with reference to the accompanying drawings.

DETAILED DESCRIPTION OF THE PREFERRED EMBODIMENTS

The present invention will be described more in detail with reference to the accompanying drawings.

First Embodiment

Structure of Engine

Figure 1:
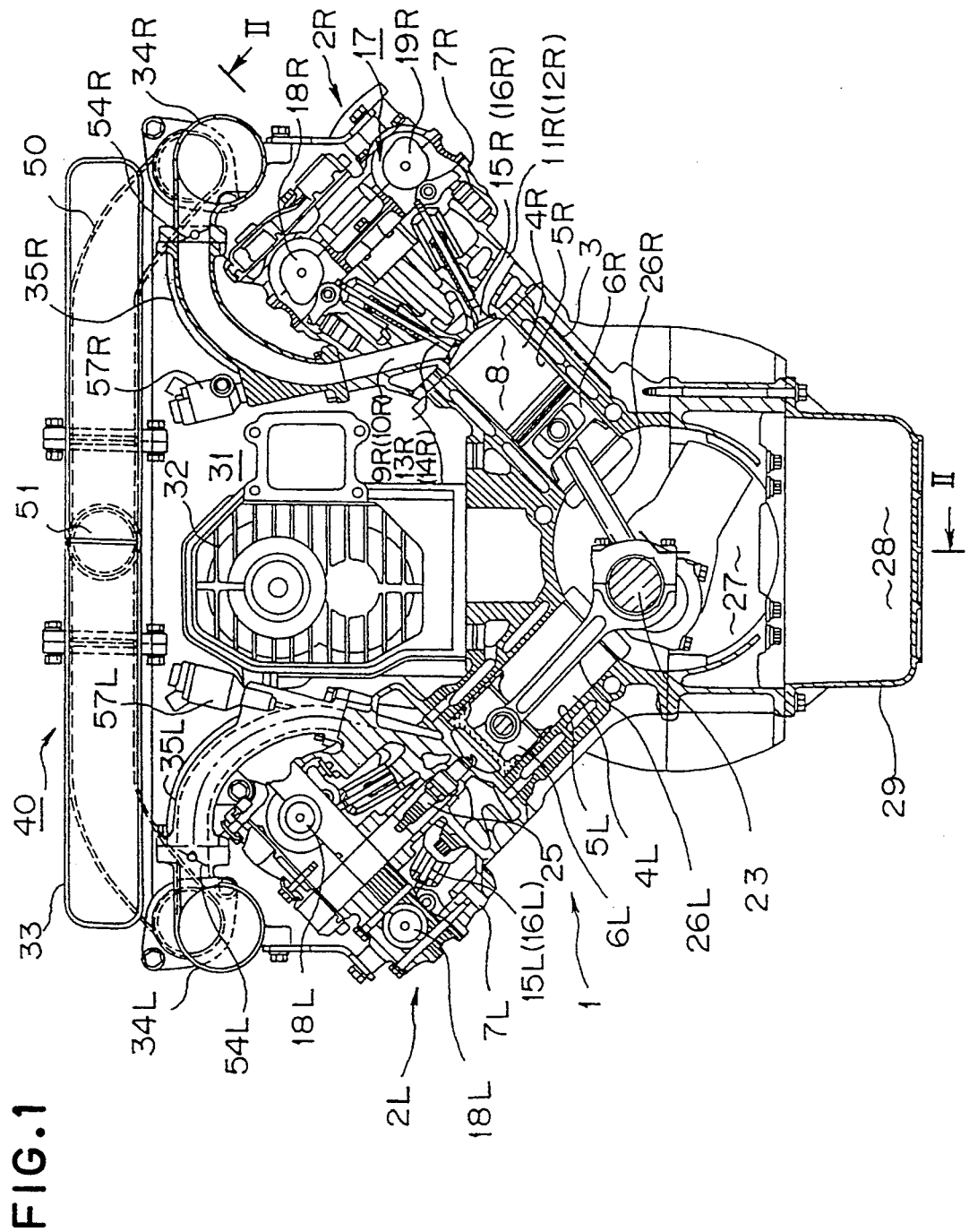
FIG. 1 is a longitudinal sectional view showing a first embodiment of an engine of a spark ignition type according to the present invention.
Figure 2:
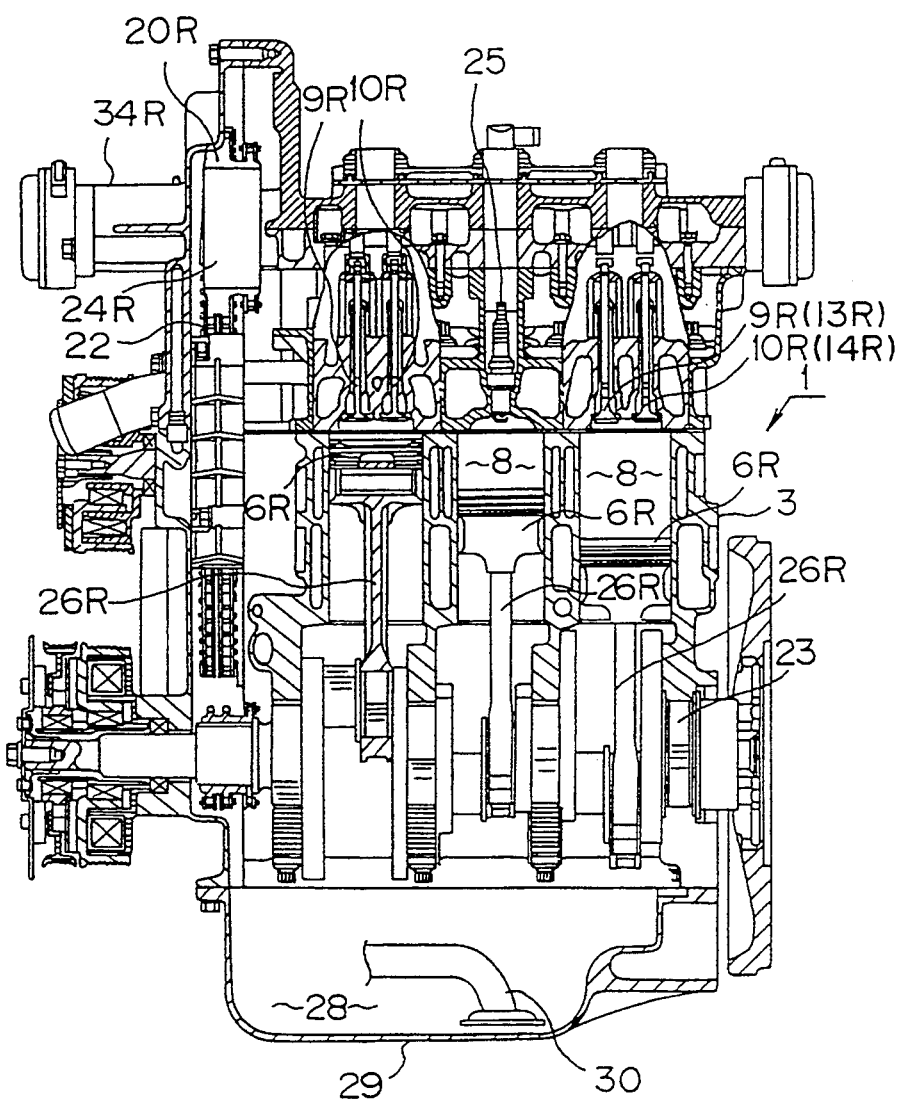
FIG. 2 is a sectional plan view taken along line II—II of FIG. 1.

As shown in FIGS. 1 and 2, a body 1 of the engine has a left-hand bank portion 2L and a right-hand bank portion 2R, which are arranged in a V-shaped relationship. Three cylinders, collectively referred to as 4, are arranged in each of the left-hand and right-hand bank portions 2L and 2R in line with each of the bank portions. In other words, the internal combustion engine to be employed for the first embodiment of the present invention is a so-called V-type 6-cylinder engine. In the description which follows, reference symbols "L" and "R" used as suffixes, as needed, are intended to mean "left-hand" and "right-hand", respectively.

A detailed description will be made of the body 1 of the engine. The body 1 of the engine has a cylinder block 3 and each of the cylinders 4 has a combustion chamber 8 of a penthouse type formed and delimited by a piston 6 inserted into a cylinder section 5 and a cylinder head 7. As specifically shown in FIG. 1, the cylinder head 7 is provided with first and second intake ports 9 and 10 as well as first and second exhaust ports 11 and 12, each having an opening at the combustion chamber 8. As further shown in FIG. 1, a first intake valve 13 is mounted to the first intake port 9 and a second intake valve 14 is mounted to the second intake port 10; and a first exhaust valve 15 is mounted to the first exhaust port 11 and a second exhaust valve 16 is mounted to the second exhaust port 12.

The body 1 of the engine to be employed in this embodiment of the present invention is a 4-valve type engine having two intake valves 13 and 14 and two exhaust valves 15 and 16 for each cylinder. A valve-operating system for operatively opening and closing the valves 13–16 is of a so-called double overhead cam (DOHC) type, which has two cam shafts 18 and 19 accommodated in the cylinder head 7. In other words, the first cam shaft 18 is adapted to operatively open and close the intake valves 13 and 14, and the second cam shaft 19 is adapted to operatively open and close the exhaust valves 15 and 16. As shown in FIG. 2, each of the first and second cam shafts 18 and 19 is provided at its shaft end with a cam pulley 20 for the intake valve (although a cam pulley for the exhaust valve is not shown in the drawing). The cam pulley 20 is mechanically associated with an output shaft (a crank shaft) 23 of the engine through a timing belt 22, in a manner as is known to the art, thereby opening and closing the intake valves 13, 14 and the exhaust valves 15, 16 at a predetermined timing, in synchronization with the rotation of the output shaft 23 of the engine.

To the first cam shaft 18 is mounted a first valve timing change-over mechanism 24 (for the intake valves) for changing a phase of the first cam shaft 18 for the cam pulley 20 for the intake valves, and the second cam shaft 19 is provided with a second valve timing change-over mechanism (for the exhaust valves) for changing a phase of the second cam shaft 19 for the cam pulley for the exhaust valves, although not shown in the drawing. The second valve timing change-over mechanism for the exhaust valves has the same structure as the first valve timing change-over mechanism 24 for the intake valves so that a description of details of the second valve timing change-over mechanism will be omitted from the description which follows. To each of the cylinder heads 7 is mounted an ignition plug 25 so as to face or direct to the center of the combustion chamber 8.

The piston 6 is connected to the crank shaft 23 through a connecting rod 26, and a chamber 28 for reserving or storing engine oil is formed by an oil pan 29 in a region underneath a crank chamber 27 for accommodating the crank shaft 23. In FIG. 2, reference numeral 30 denotes an oil strainer.

In the middle space 31 interposed between the left-hand and right-hand bank portions 2L and 2R is mounted a supercharger 32 of a screw type which is mechanically driven by the force of rotation of the crank shaft 23, as shown in FIG. 1. Over the supercharger 32, there is disposed an intercooler 33. On the other hand, above each of the left-hand and right-hand bank portions 2L and 2R, there is disposed a surge tank 34 extending lengthwise along the crank shaft 23, and the surge tank 34 is connected to the intake ports 9 and 10 for each cylinder 4 through a discrete intake tube 35. As an upstream end of each of the intake ports 9 and 10 in the respective left-hand and right-hand bank portions 2L and 2R is disposed so as to open facing the middle space 31 interposed between the bank portions 2L and 2R, the discrete intake tube 35 is arranged in such a shape as firstly extending transversely from the surge tank 34 toward the central space 31 and then curving downward.

A detailed description will now be made of an intake system 40 for the body 1 of the engine with reference to FIG. 3.

The intake system 40 comprises a common intake tube 41, the left-hand surge tank 34L, the right-hand surge tank 34R, and the discrete intake tube 35, which are disposed in this order from the upstream side toward the downstream side. To the common intake tube 41 are disposed an air cleaner 42, an air flowmeter 43, and a throttle valve 44 in this order from the upstream side toward the downstream side. The common intake tube 41 has a first bypass 45 disposed so as to bypass the throttle valve 44 and a second bypass 46 so as to bypass the supercharger 32 of a screw type.

The first bypass 45 is provided with an ISC valve 47 which in turn can adjust the number of idling rotation in a manner as is known to the art. On the other hand, the second bypass 46 is provided with a relief valve 49 which is driven by an actuator 48 of a diaphragm type. The relief valve 49 is so arranged as to be opened when the pressure charged becomes higher than a predetermined value, thereby opening the second bypass 46. On the other hand, the left-hand surge tank 34L is communicated with the right-hand surge tank 34R through a connecting tube 50 which in turn is provided in its intermediate position with a variable valve 51 for controlling intake air variably, for example, which is arranged so as to be opened and closed in accordance with the number of rotation of the engine, thereby achieving the dynamic effect of intake air over a wide region in a manner as is known to the art.

The discrete intake tube 35 is provided with a partition wall 35a to thereby divide its internal space partially into left-hand and right-hand sections, i.e. a first discrete intake tube 52 and a second discrete intake tube 53. The first discrete intake tube 52 is connected with the first intake port 9, and the second discrete intake tube 53 is connected with the second intake port 10. The second discrete intake tube 53 is so arranged as to be opened or closed with a shutter valve 54 mounted at its upstream end portion. Each of the shutter valves 54L disposed in the left-hand bank portion 2L is connected with a common shaft 55L for the left-hand bank portion 2L, and each of the shutter valves 54R disposed in the right-hand bank portion 2R is connected with a common shaft 55R for the right-hand bank portion 2R. To a shaft end of each of the common shafts 55L and 55R is mounted an actuator (not shown).

A fuel supply system of the body 1 of the engine comprises an upstream injector 56 and a downstream injector 57. The upstream injector 56 is mounted on the immediately upstream side of the supercharger 32 and the downstream injector 57 is mounted in the discrete intake tube 35 so as to face the first intake port 9 and the second intake port 10. In FIG. 3, reference numeral 58 denotes an assist air passage and reference numeral 59 denotes a check valve.

Figure 3:
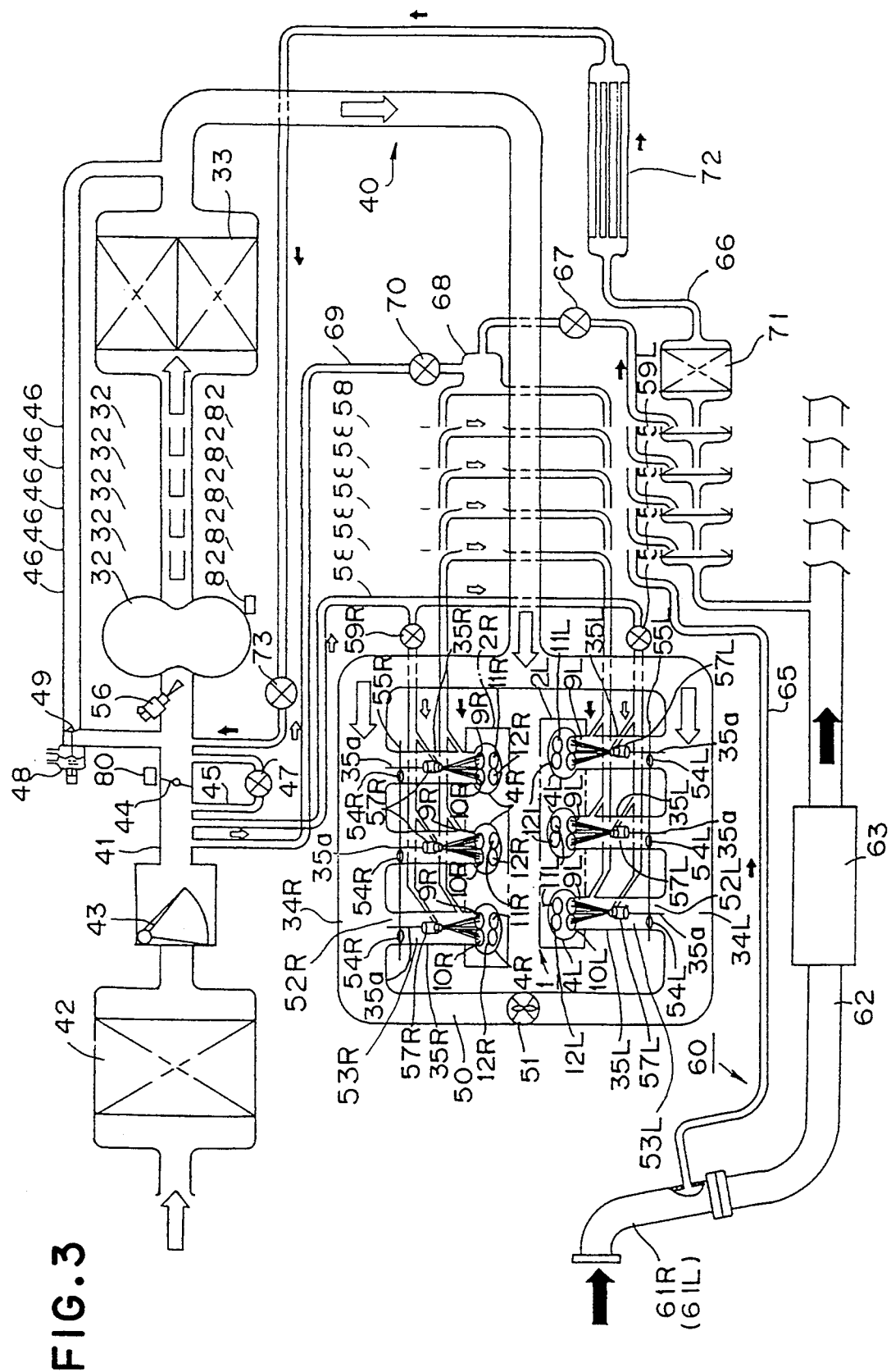
FIG. 3 is a schematic representation showing an intake system and an exhaust system of the internal combustion engine according to the first embodiment of the present invention.

As shown in FIG. 3, an exhaust system 60 of the engine comprises a left-hand exhaust manifold 61L for the left-hand bank portion 2L, a right-hand exhaust manifold 61R for the right-hand bank portion 2R, and a common exhaust tube 62, which are disposed in this order from the upstream side toward the downstream side. The common exhaust tube 62 is provided in its intermediate position with a catalyst (ternary catalyst) converter 63 for cleaning exhaust gases and at its downstream end with a silencer (not shown) in a manner as is known to the art.

The body 1 of the engine has a first outer EGR passage 65 and a second outer EGR passage 66, each of which is made up of an outer tube. A transversely sectional diameter of the first outer EGR passage 65 is smaller than that of the second outer EGR passage 66. The first outer EGR passage 65 is so adapted as to be employed in a low load region, while the second outer EGR passage 66 is so adapted as to be employed in a high load region, as will be described hereinafter.

The first outer EGR passage 65 is connected at its one end to the exhaust manifold 61L or 61R and at its other end to the first intake port 9. To the first outer EGR passage 65 are mounted a first EGR valve 67 on its one end side and a collective chamber 68 on its other end side. The collective chamber 68 is communicated with the common intake tube 41 through a bypass air tube 69 to which a bypass air control valve 70 in turn is mounted. On the other hand, one end of the second outer EGR passage 66 is connected to the common exhaust tube 62 on the side downstream of the catalyst converter 63, and the other end thereof is connected to the common intake tube 41 on the side downstream of the throttle valve 44. The second outer EGR passage 66 is provided from the one end side to the other end side with a carbon trap 71, an EGR cooler 72, and a second EGR valve 73.

Specification of Engine

A specification of the engine is as follows:
(1) Type of engine: V-type 6-cylinder; DOHC 4-valve engine
(2) Angle between the left-hand bank portion and the right-hand bank portion: 90°
(3) Displacement: 1,496 cc
(4) Bore size of cylinder: 63 mm in diameter
(5) Stroke of piston: 80 mm
(6) Compression ratio ($\epsilon$): $\epsilon = 10$
(7) Angle between the intake valve and the exhaust valve: 30°
(8) Supercharger: of a screw type (a pressure ratio = 2.5)
(9) Temperature at the outlet of the intercooler: 60° C.
(10) Fuel: regular gasoline (octane value=91)

In other words, the spark ignition type engine according to the embodiment of the present invention has the cylinder section 5 with a small bore size and a long stroke wherein the stroke of the piston (S) is longer with respect to the bore size (B). Further, the engine has a high compression ratio, and the pressure to be charged is set to be higher.

Figure 4:
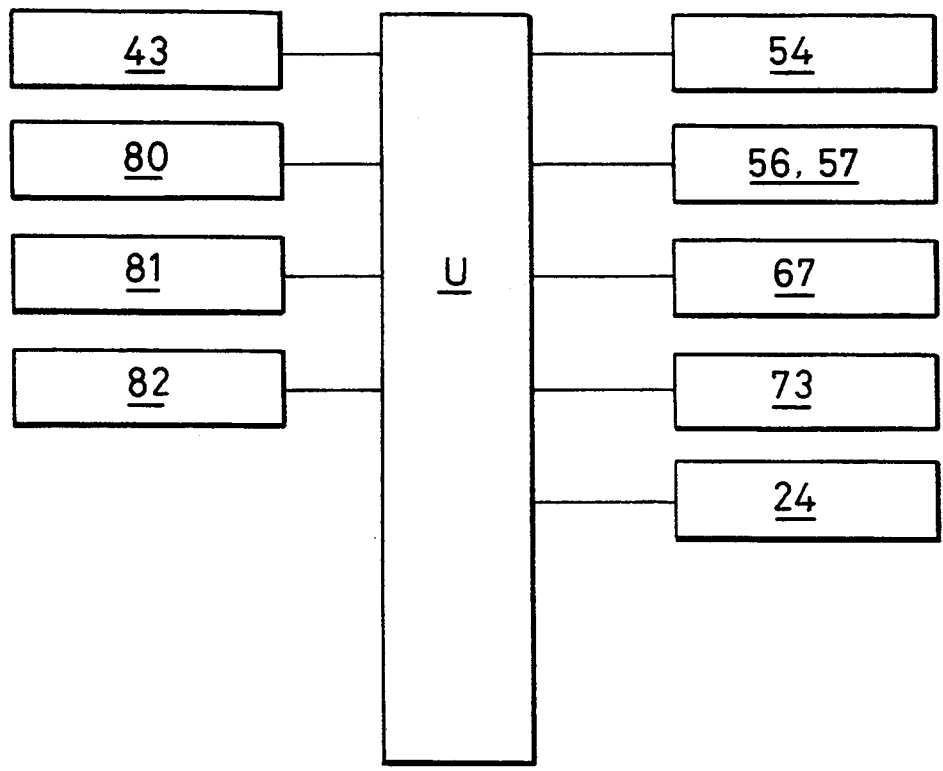
FIG. 4 is a block diagram showing a control system of the internal combustion engine according to the first embodiment of the present invention.

The engine has a control unit U as shown in FIG. 4, and the control unit U is comprised of, for example, a microcomputer. Into the control unit U, signals are entered from the air flowmeter 43 for sensing an amount of intake air, a sensor 80 for sensing the load of the engine on the basis of a negative pressure of the intake air, a sensor 81 for sensing the number of rotation of the engine, and a sensor 82 for sensing the number of rotation of the supercharger 32. On the other hand, the control unit U generates control signals to the shutter valve 54, the upstream injector 56, the downstream injector 57, the first EGR valve 67, the second EGR valve 73, and the first valve timing change-over mechanism 24 for the intake valves.

The following is a description of the control to he made by the control unit U.

Control of Shutter Valve 54

The shutter valve 54 is so arranged as to be closed in a low rotational region where the number of rotation of the engine is lower than, for example, 3,000 rpm and opened in a high rotational region where the number of rotation of the engine is higher than, for example, 3,000 rpm. In such a low rotational region where the amount of intake air is smaller, on the one hand, the intake is performed by opening the first discrete intake tube 52 only while closing the second discrete intake tube 53. In the high rotational region where the amount of intake air becomes larger, on the other hand, the intake is performed by opening both of the first and second discrete intake tubes 52 and 53.

Control of Valve Timing

Figure 5:
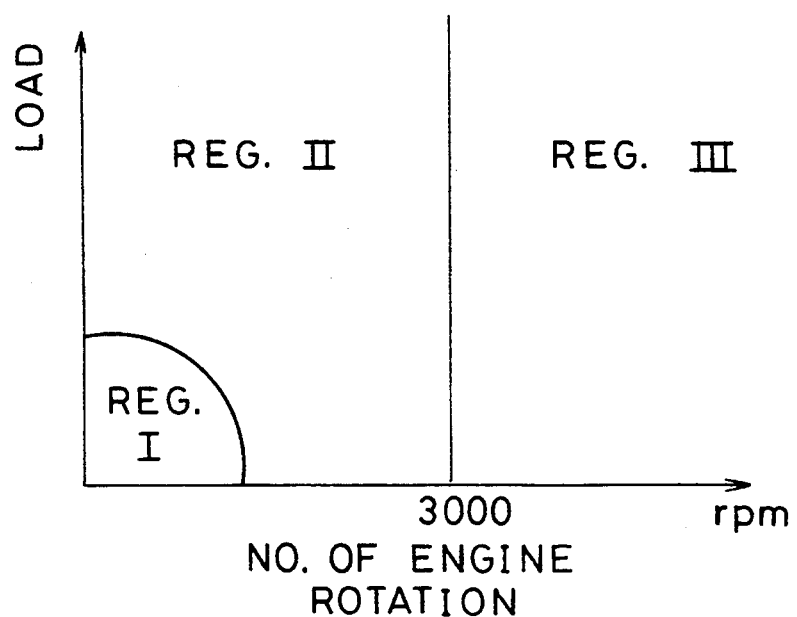
FIG. 5 is a map for controlling a variable valve timing mechanism.

The valve timing for regions I, II and III will be described with reference to the map as indicated in FIG. 5.

Figure 6:
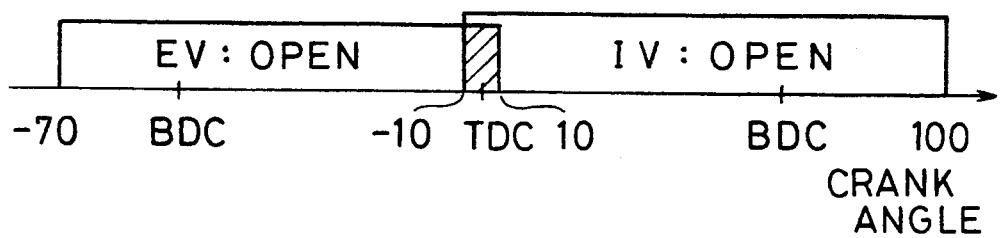
FIG. 6 is a diagram describing the action of a variable valve timing mechanism in a region I as shown in FIG. 5.

Region I: The region I is a region where the load of the engine is low and the number of rotation of the engine is low. As shown in FIG. 6, reference symbol "EV" denotes the exhaust valve and reference symbol "IV" denotes the intake valve (this being applied to FIGS. 7, 8, 19, 20, and 21).

In this region, as shown in FIG. 6, the valve timing for opening the exhaust valves 15 and 16 is set at 70 deg (crank angle) before the bottom dead center (BBDC) while the valve timing for closing them is set at 10 deg (crank angle) after the top dead center (ATDC); on the other hand, the valve timing for opening the intake valves 13 and 14 is set at 10 deg (crank angle) after the top dead center (BTDC) while the valve timing for closing them is set at 100 deg (crank angle) after the bottom dead center (After bottom dead center).

Region II: This region is a low rotational region where the number of revolutions of the engine is equal to or lower than 3,000 rpm.

Figure 7:
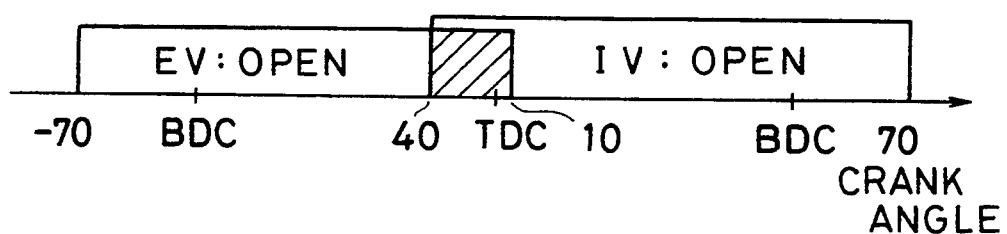
FIG. 7 is a diagram describing the action of the variable valve timing mechanism in a region II as shown in FIG. 5.

In the region II, as shown in FIG. 7, the valve timing for opening the exhaust valves 15 and 16 is set at 70 deg (crank angle) before the bottom dead center (BBDC) and the valve timing for closing them is set at 10 deg (crank angle) after the top dead center (ATDC). On the other hand, the valve timing for opening the intake valves 13 and 14 is set at 40 deg (crank angle) after the top dead center (BTDC) and the valve timing for closing them is set at 70 deg (crank angle) after the bottom dead center (ABTC).

Region III: This region is a high rotational region where the number of revolutions of the engine is over 3,000 rpm.

Figure 8:
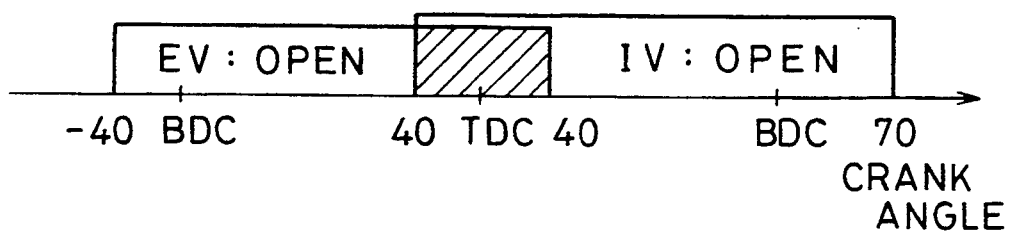
FIG. 8 is a diagram describing the action of the variable valve timing mechanism in a region III as shown in FIG. 5.

In the region III, as shown in FIG. 8, the valve timing for opening the exhaust valves 15 and 16 is set at 40 deg (crank angle) before the bottom dead center (BBDC) and the valve timing for closing them is set at 40 deg (crank angle) after the top dead center (ATDC). On the other hand, the valve timing for opening the intake valves 13 and 14 is set at 40 deg (crank angle) before the top dead center (BTDC) and the valve timing for closing them is set at 70 deg (crank angle) after the bottom dead center (ABDC).

In summary, the intake valves 13 and 14 are set so as to be delayed in closing in all the regions, as compared with conventional engines. More specifically, the intake valves 13 and 14 are delayed in closing to an extremely late extent, as compared with the conventional ones, particularly in the region I. Further, an overlap of an open state of the intake valve with an open state of the exhaust valve is set to be smaller in the region I than in the region II and III. In the region II, an overlap of the range of the crank angle, at which the exhaust valves 15 and 16 are open, with the range of the crank angle, at which the intake valves 13 and 14 are open, is larger than that in the region I yet smaller than in the region III. In the region III, an overlap of the crank angle, at which the exhaust valves 15 and 16 are open, with the crank angle at which the intake valves 13 and 14 are open, is larger than that in the region I and smaller than that in the region II.

The foregoing description can be briefed as follows:
(1) Region I (with the low load of the engine and the low number of rotation of the engine): the overlap is smaller and the closing of the intake valves is delayed to an extremely late extent.
(2) Region II (with the number of revolutions of the engine of 3,000 rpm or less): the overlap is larger than that in the region I yet smaller than that in the region III, and the closing of the intake valves is delayed.
(3) Region III (with the number of revolutions of the engine of over 3,000 rpm): the overlap is larger than that in any other regions, and the timing of closing the intake valve is delayed.

Control of EGR

Figure 9:
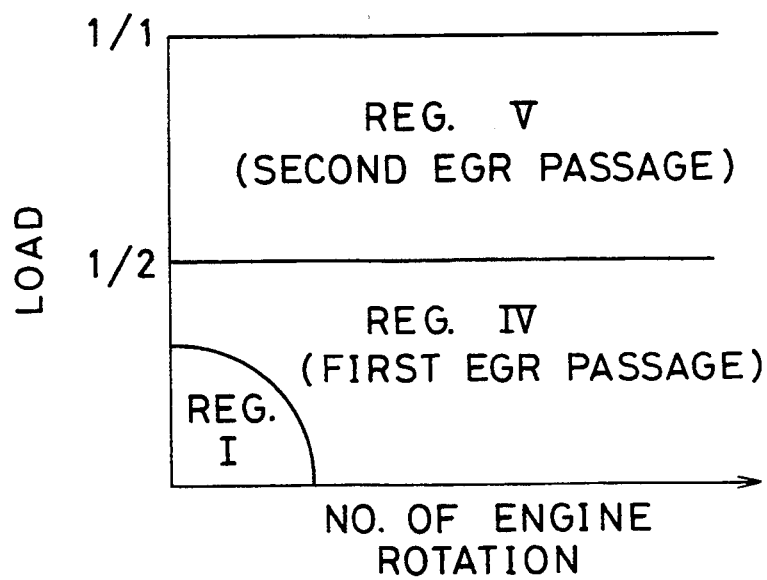
FIG. 9 is a control map for controlling the recirculation of exhaust gases (EGR) according to the first embodiment of the present invention.

The control of the recirculation of exhaust gases (EGR) is performed in three regions, i.e. region I, IV, and V, on the basis of the map as indicated in FIG. 9 by controlling the first EGR valve 67 and the second EGR valve 73 in a fashion as will be described hereinafter.

Region I: This region is a region wherein the load of the engine is low and the number of rotation of the engine is low, as have been described hereinabove.

In this region I, both of the first and second EGR valves 67 and 73 are closed to full extent.

Region IV: This region is a region wherein the angle at which the throttle valve 44 is open is smaller than a half of the entire angle of the opening of the throttle valve 44.

In the region IV, the rate of the exhaust gases to be recirculated is adjusted by opening the first EGR valve 67 while the second EGR valve 73 is closed. In other words, exhaust gases are recirculated by taking use of the first outer EGR passage 65.

Region V: This region is a supercharging region in which the angle of the opening of the throttle valve 44 is over a half and which contains a full load range.

In the region V, the rate of the exhaust gases to be recirculated is adjusted by opening the second EGR valve 73 while the first EGR valve 67 is closed. In other words, the exhaust gases are recirculated through the second outer EGR passage 72 with the EGR cooler 72. Further, in this region, the rate of the recirculation of the exhaust gases is so arranged as to be constant with respect to the load or to be increased as the load becomes larger in the vicinity of the full load region, for example, particularly wherein the elevation of the temperature within the engine may cause the problem.

Figure 10:
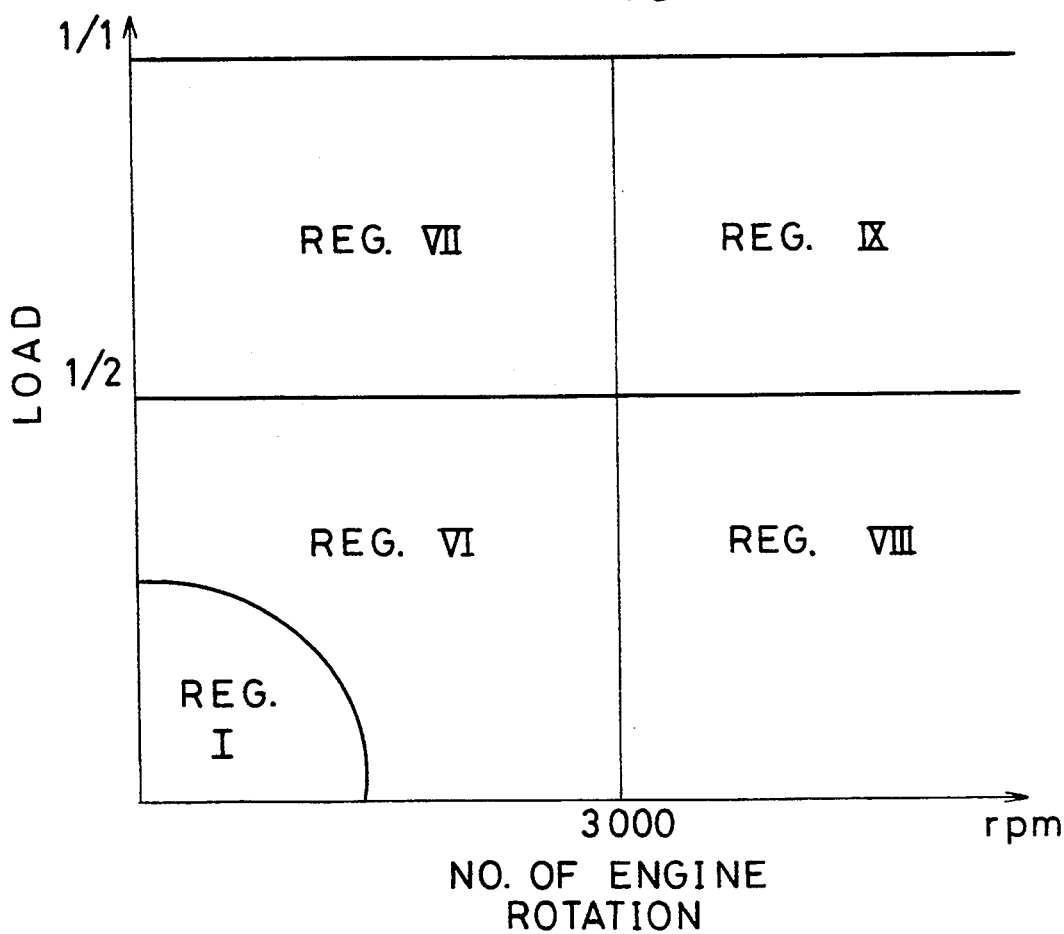
FIG. 10 is a control map in which the control of the variable valve timing mechanism is combined with the control of the recirculation of the exhaust gases (EGR).
Figure 11:
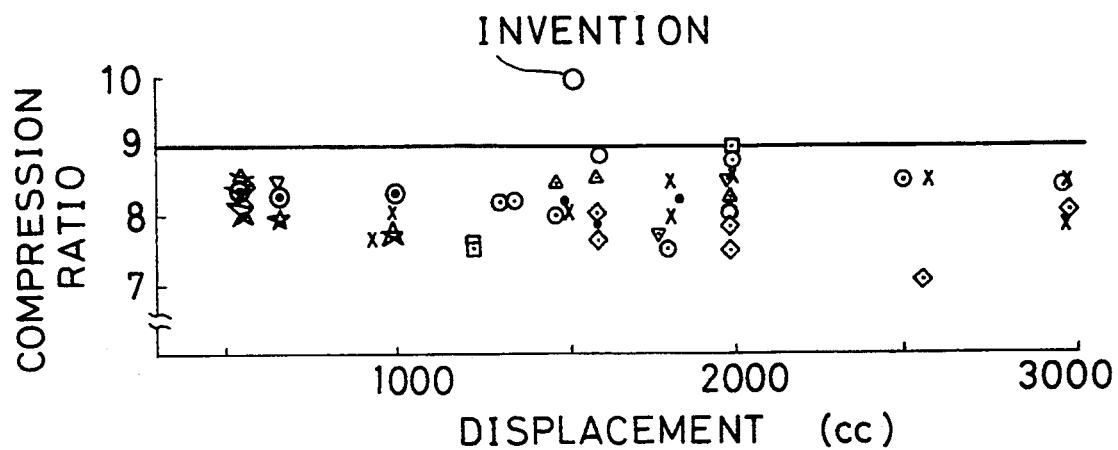
FIG. 11 is a diagram showing a comparison between the internal combustion engine according to the first embodiment of the present invention and conventional engines on the basis of the compression ratio vs. displacement.
Figure 12:
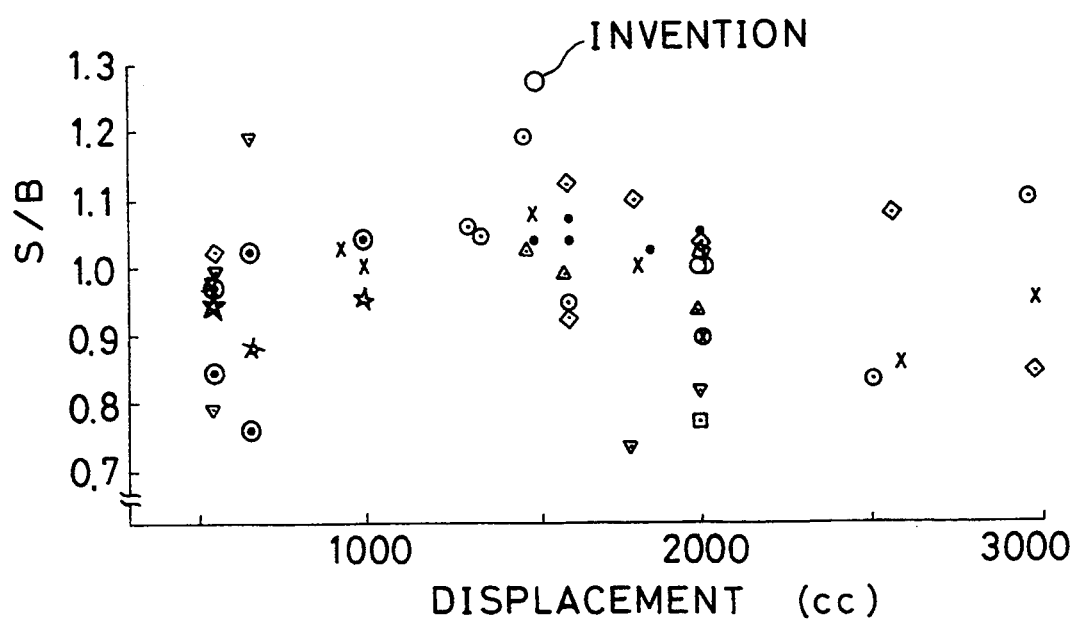
FIG. 12 is a diagram showing a comparison between the internal combustion engine according to the embodiment of the present invention and conventional engines on the basis of the S/B ratios vs. displacement.
Figure 13:
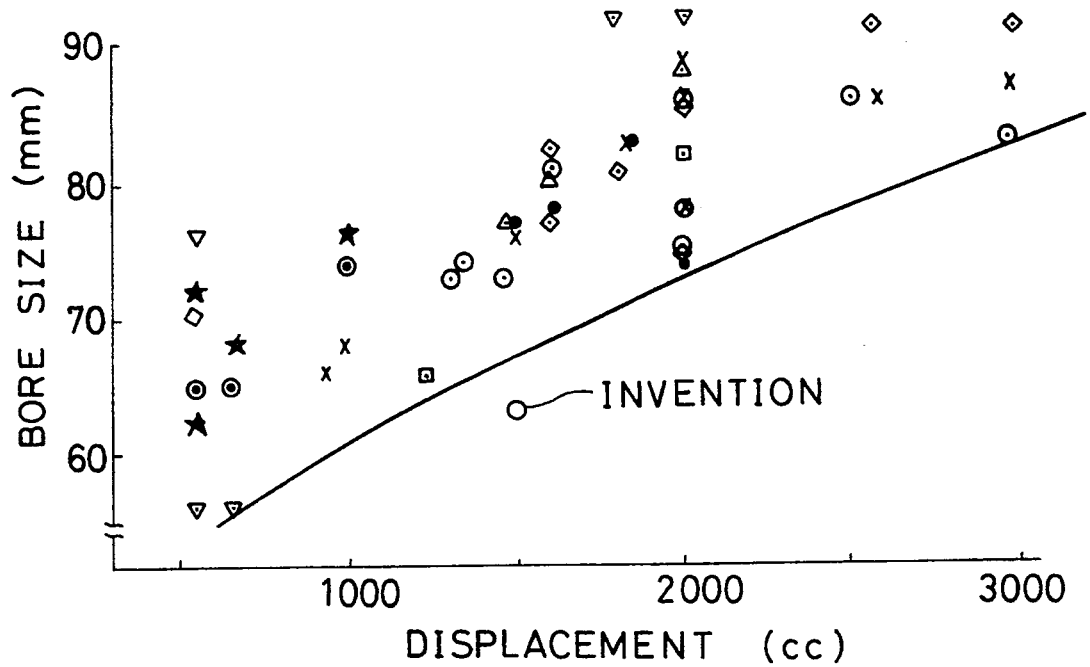
FIG. 13 is a diagram showing a comparison between the internal combustion engine according to the embodiment of the present invention and conventional engines on the basis of the bore sizes vs. displacement.
Figure 14:
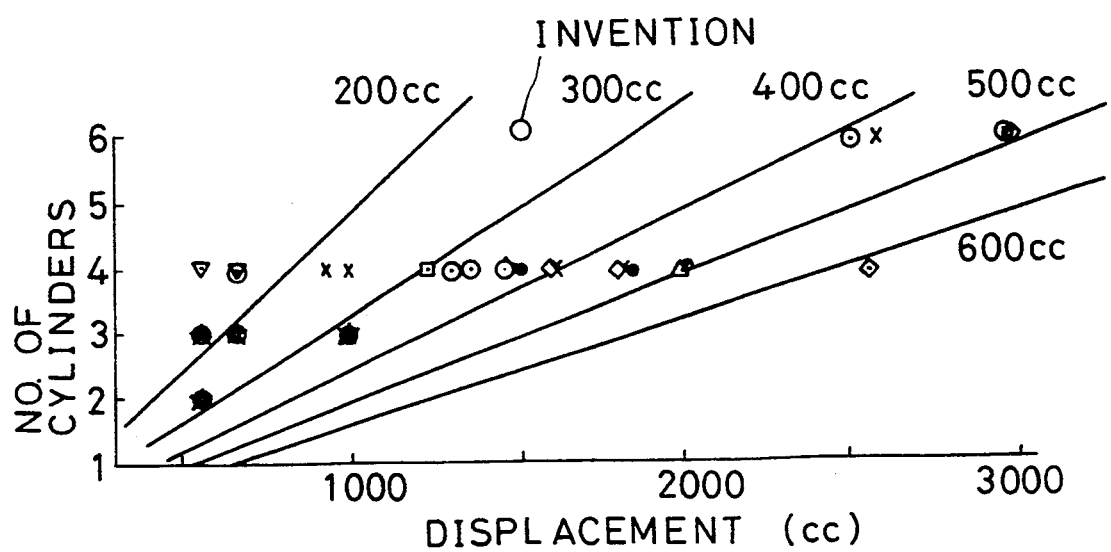
FIG. 14 is a diagram showing a comparison between the internal combustion engine according to the embodiment of the present invention and conventional engines on the basis of the number of cylinders vs. displacement.

It is to be noted that FIG. 10 is prepared by a combination of FIG. 5 indicative of the control of the valve timing with FIG. 9 indicative of the control of the EGR. In FIG. 10, the region is divided into five regions, I, VI, VII, VIII, and IX. A detailed description will be made of the regions I, VI and VII, where the problems arise with stability in combustion, fuel economy or knocking. The engine is controlled in these regions in such a manner as will be described hereinafter.

Region I: This region is a region in which the load is extremely light, that is, the load of the engine is low and the number of rotation of the engine is low, as described hereinabove. In the region I, combustion is likely to become unstable.

In this region, the recirculation of the exhaust gases via the outer EGR passages (i.e. an outer EGR) is inhibited and there is a smaller overlap between the crank angle at which the exhaust valves 15 and 16 are open and the crank angle at which the intake valves 13 and 14 are open. Hence, the amount of gases which are left in the combustion chamber 8 is so small that the stability in combustion can be ensured. Further, as the angle at which the throttle valve 44 is open is small in the region I, the closing of the intake valves 13 and 14 is delayed at an extremely late timing, so that a loss in pumping can be reduced.

Region VI: This region is a region where the load is light, or the load of the engine is low and the rotation is low. In other words, in this region, the number of rotation of the engine is 3,000 rpm or lower and the load is lower than a half of the full load.

In the region VI, the combustion is relatively stable, so that an overlap of the crank angle at which the exhaust valves 15 and 16 are open with the crank angle at which the intake valves 13 and 14 are open is set to be larger. Hence, a so-called internal EGR is performed in addition to the outer EGR by recirculating the exhaust gases through the first outer EGR passage 65. In other words, in the region VI, as the overlap of the range in which the exhaust valves 15 and 16 are open with the range in which the intake valves 13 and 14 are open is set large, the internal EGR is carried out by causing a large amount of gases having a higher temperature to be remained in the combustion chamber 8. Further, the exhaust gases to be recirculated through the first outer EGR passage 65 are relatively high in temperature because the exhaust gases withdrawn from the engine are recirculated to the body 1 of the engine through the first outer EGR passage 65 whose upstream end is communicated with the exhaust manifold 61, before they are allowed to become cool in the exhaust system 60.

In addition, the closing of the intake valves 13 and 14 is delayed, so that the delay in closing them in combination with the recirculation of the exhaust gases having higher temperature can reduce a loss in pumping in the region VI.

Region VII: This region contains a region wherein the rotation is low and the load of the engine is high (including the full load). In other words, the number of rotation of the engine is 3,000 rpm or lower and the load is larger than a half of the total load. This region also serves as a supercharging region.

In the region VII, the overlap of the range of the crank angles at which the exhaust valves 15 and 16 are open with the range of the crank angles at which the intake valves 13 and 14 are open is set to be so large that the exhaust gases are scavenged in the combustion chamber 8, thereby suppressing the temperature within the cylinders (the temperature within the cylinders 4) from elevating by means of the internal or inside EGR. In addition, in the region VII, the closing of the intake valves 13 and 14 is delayed, so that the effective stroke of the piston 6 in the compression stroke becomes shorter, thereby lowering the elevation of the temperature within the cylinders when the intake air is compressed. Furthermore, in this region VII, the exhaust gases are allowed to cool through the second outside EGR passage 66 with the EGR cooler 72 equipped thereto and then recirculated, i.e. a so-called cold EGR is performed, thereby suppressing the temperature within the cylinder from elevating.

The upstream end of the second outside EGR passage 66 is connected on the downstream side of the exhaust system 60, so that the exhaust gases cooled through the exhaust system 60 are introduced into the second outside EGR passage 66. On the other hand, the downstream end of the second outside EGR passage 66 is connected on the outside side of the intercooler 33, so that the exhaust Gases recirculated into the intake system 40 through the second outside EGR passage 66 are allowed to cool again with the intercooler 33. Hence, the outside recirculation of the exhaust gases through the second outside EGR passage 66 can further lower the temperature within the cylinders.

In the region VII, the temperature within the cylinder can be lowered in the way as described hereinabove by means of scavenging, delaying the closing of the intake valves 13 and 14, and the cold EGR, so that the heat load within the engine can be lowered to thereby protect the valve bridge, an occurrence of knocking can be suppressed, and the amount of NOx within the exhaust gases can be decreased in the region VII.

Control of Air-Fuel Ratio

The main body 1 of the engine is subjected to feedback control so as for the air-fuel ratio of the mixed fuel to become stoichiometric ($\lambda = 1$) in a wide region containing the region V (as shown in FIG. 9) where the exhaust gases is recirculated through the second EGR passage 66. The feedback control is well known to the art, so that a description thereof will be omitted from a description which follows.

Figure 15:
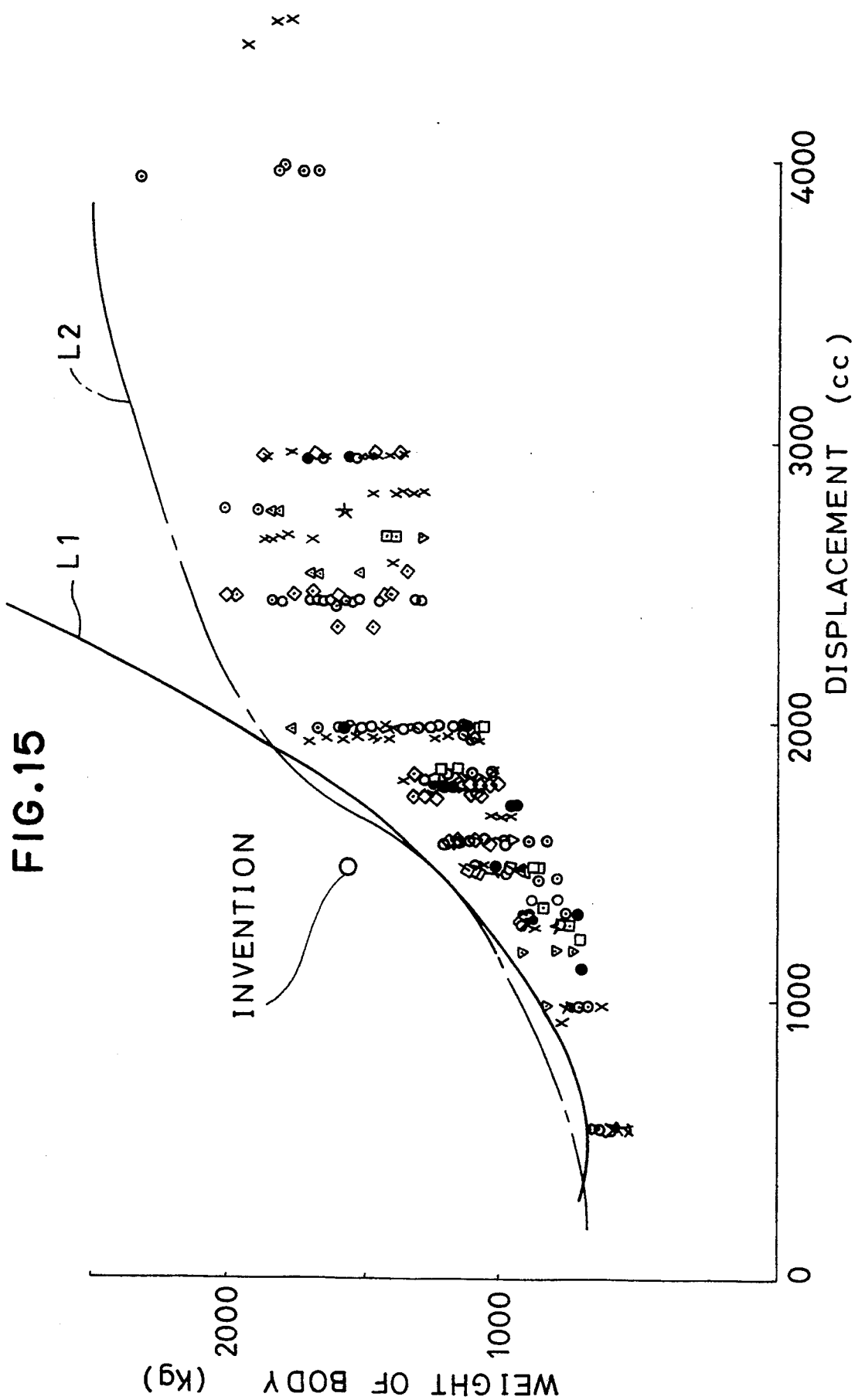
FIG. 15 is a diagram showing a comparison between the internal combustion engine according to the embodiment of the present invention and conventional engines on the basis of the weight of the body of the vehicle vs. displacement.

It is to be noted that FIGS. 11 to 14 indicate each a comparison of the characteristics of the engine according to the present invention and conventional ones. As is apparent from FIG. 11, it is found that the engine according to the present invention has a higher compression ratio than conventional ones; it is found from FIG. 12 that a stroke is longer than the conventional ones; it is found from FIG. 13 that the bore size is small with respect to the displacement; and it is further found from FIG. 14 that the number of cylinders is large with respect to the displacement. Referring further to FIG. 15, the body of the vehicle on which the body 1 of the engine is loaded weighs approximately 1,500 kg, and it is found from the relationship of the weight of the body of the vehicle with the displacement that this weight of the body of the vehicle corresponds to the weight of a conventional vehicle on which an engine having a displacement of 3,000 cc can be loaded. In other words, the engine according to the present invention can produce output larger by twice the conventional engines by making the pressure higher by charging more air into the engine and making the compression ratio higher. More specifically, a 1.5-liter engine to which the present invention is applied can produce an output that is equal to or corresponds to a conventional 3.0-liter engine.

It can be noted herein that the reference line L1 in FIG. 15 can be represented by the formula (1) as follows:

$$W = 543.3 \left[ \frac{V}{1000} \right]^2 - 508.8 \left[ \frac{V}{1000} \right] + 815$$

where

W is the weight of the body of the vehicle; and
V is the displacement.

Further, the reference line L2 of FIG. 15 can be represented by the formula (2) as follows:

$$\frac{W}{1000} = 1.534\left[\frac{V}{1000}\right]^3 - 6.834\left[\frac{V}{1000}\right]^2 + 10.792\left[\frac{V}{1000}\right] - \frac{4.332}{1000}$$

where

W and V has the same meaning as above.

Hence, the engine according to the present invention having the characteristics as described hereinabove can improve the fuel economy by making the displacement smaller and, at the same time, achieve improvements in heat efficiency and fuel economy by making the compression ratio higher. Further, the engine according to the present invention having the longer stroke can reduce a burden imposed upon the bearing units, thereby reducing a mechanical loss. In addition, the engine with multiple cylinders according to the present invention can provide less vibration for an internal combustion engine.

As the temperature within the engine is elevated when the air-fuel ratio is controlled so as to become stoichiometric in the region V including the full load region (as shown in FIG. 9) in the manner as described hereinabove, the rate of the recirculation of the exhaust gases is set to become constant with respect to the load or to become larger as the load is made larger in the region V, so that the elevation of the temperature within the engine can be suppressed by the exhaust gases which are recirculated. The rate of the recirculation of the exhaust gases will be described more in detail hereinafter.

This is effective for enhancing reliability of the engine particularly in the full load region, when the compression ratio of the engine is made higher and the pressure to be charged by forcing more air into the engine is made higher. More specifically, the recirculation of the exhaust gases can suppress the elevation of the temperature within the engine which is caused by making the air-fuel ratio leaner in the high load region, as compared with the conventional ones, so that it is effective for enhancing reliability of the engine particularly in the full load region. Further, as the compression ratio of the engine is made higher, the rate of consumption of the fuel in the high load region can be saved to a great extent.

Figure 16:
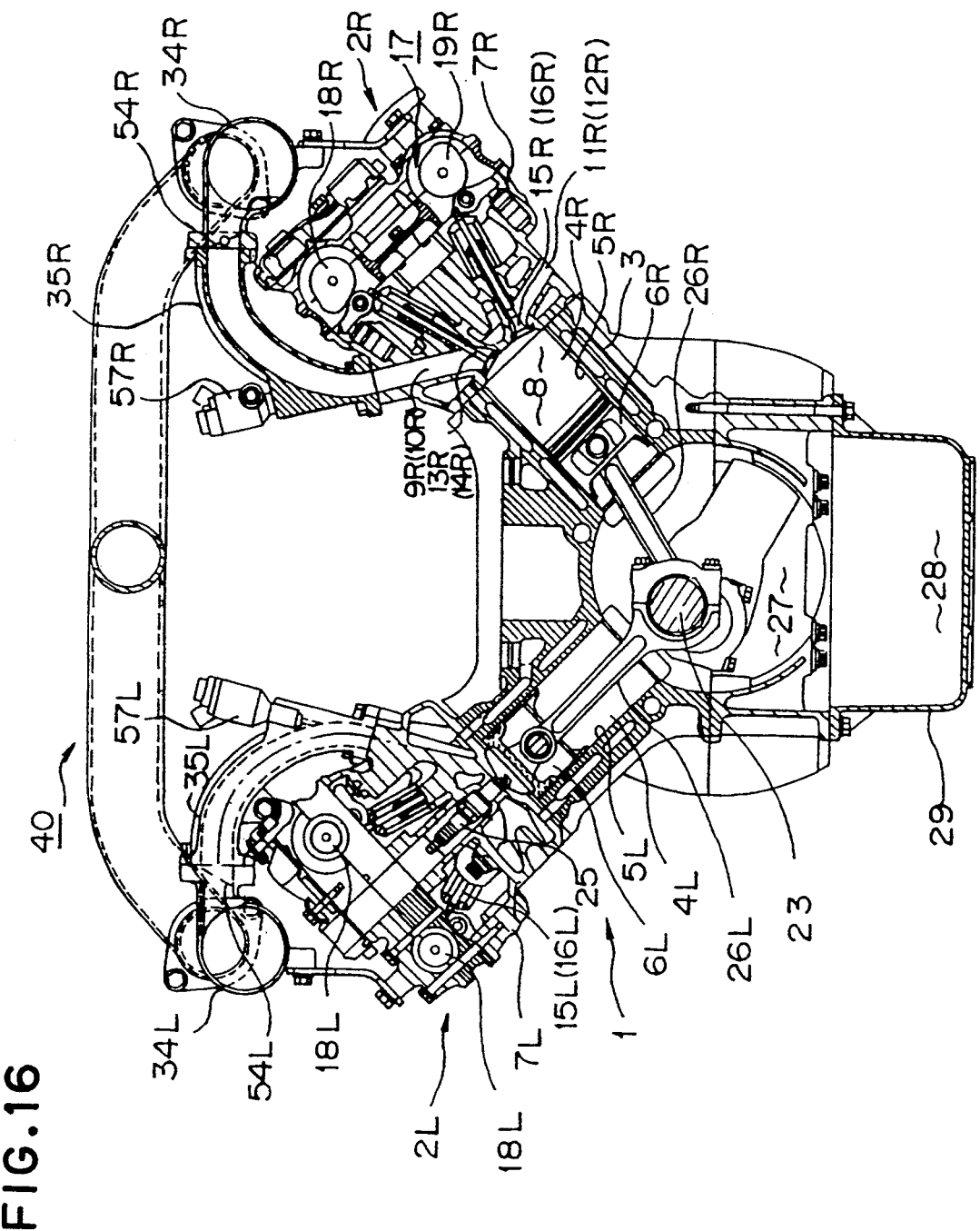
FIG. 16 is a longitudinal sectional view showing a second embodiment of an engine of a spark ignition type according to the present invention.

Second Embodiment (FIGS. 16 et seq.)

The second embodiment according to the present invention relates to an internal combustion engine of a natural intake type. In this embodiment, the same elements are provided with the same reference numerals and symbols as in the first embodiment, so that a duplicate description will be omitted from a description of the second embodiment, which follows.

As shown in FIG. 16, the engine in this second embodiment has substantially the same configuration as in the first embodiment from which the mechanical supercharger 32 is excluded.

The engine of a natural intake type according to the second embodiment of the present invention has the specification as follows:

Specification of Engine (1) Type of engine: V-type 6-cylinder; DOHC 4-valve engine (2) Angle between the left-hand bank portion and the right-hand bank portion: 90°

(3) Displacement: 1,496 cc (4) Bore size of cylinder: 63 mm in diameter (5) Stroke of piston: 80 mm (6) Compression ratio ($\epsilon$): $\epsilon=12$ (although $\epsilon=11$ is also acceptable)

(7) Angle between the intake valve and the exhaust valve: 30°

(8) Fuel: regular gasoline (octane value=91)

Control of Shutter Valve 54

The shutter valve 54 is so arranged as to be closed in a low rotational region where the number of rotation of the engine is lower than, for example, 3,000 rpm and opened in a high rotational region where the number of rotation of the engine is higher than, for example, 3,000 rpm. In such a low rotational region where the amount of intake air is smaller, on the one hand, the air is inhaled by opening the first discrete intake tube 52 only while closing the second discrete intake tube 53. In the high rotational region where the amount of intake air should be made larger, on the other hand, the air is inhaled by opening both of the first and second discrete intake tubes 52 and 53.

Control of Valve Timing

Figure 18:
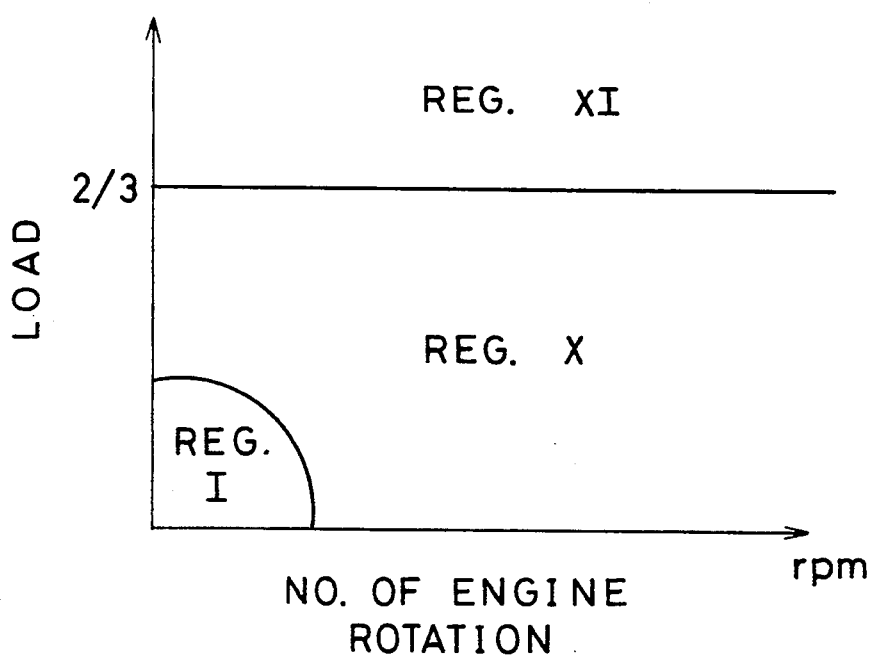
FIG. 18 is a map for controlling a variable valve timing mechanism according to the second embodiment of the present invention.

The valve timing for regions I, X and XI will be described with reference to the map as indicated in FIG. 18.

Figure 19:
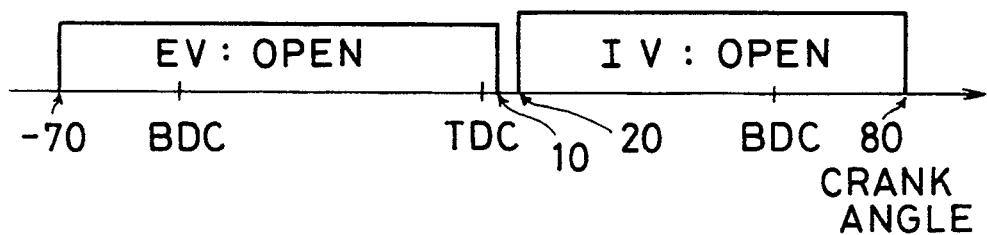
FIG. 19 is a diagram describing the action of a variable valve timing mechanism in a region I as shown in FIG. 18.

Region I: The region I is a low load and low rotational region. As shown in FIG. 19, reference symbol "EV" denotes the exhaust valve and reference symbol "IV" denotes the intake valve (this being applied to FIGS. 20 and 21).

In this region, as shown in FIG. 19, the valve timing for opening the exhaust valves 15 and 16 is set at 70 deg (crank angle) before the bottom dead center (BBDC) while the valve timing for closing them is set at 10 deg (crank angle) after the top dead center (ATDC); on the other hand, the valve timing for opening the intake valves 13 and 14 is set at 20 deg (crank angle) after the top dead center (ATDC) while the valve timing for closing them is set at 80 deg (crank angle) after the bottom dead center (ABDC).

Region X: This region is a region where the load of the engine is below two thirds of the full load.

Figure 20:
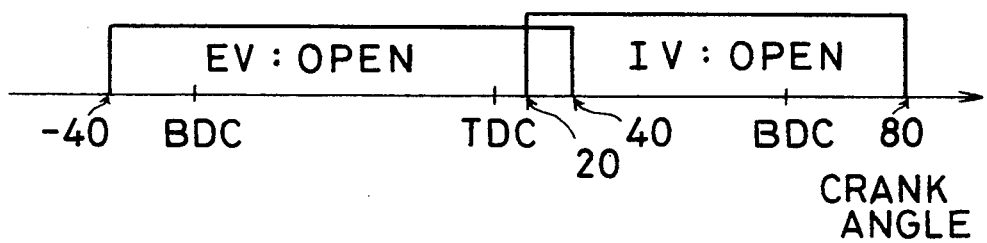
FIG. 20 is a diagram describing the action of the variable valve timing mechanism in a region X as shown in FIG. 18.

In the region X, as shown in FIG. 20, the valve timing for opening the exhaust valves 15 and 16 is set at 40 deg (crank angle) before the bottom dead center (BBDC) and the valve timing for closing them is set at 40 deg (crank angle) after the top dead center (ATDC). On the other hand, the valve timing for opening the intake valves 13 and 14 is set at 20 deg (crank angle) after the top dead center (ATDC) and the valve timing for closing them is set at 80 deg (crank angle) after the bottom dead center (ABDC).

Region XI: This region is a region where the load of the engine is above two thirds of the full load.

Figure 21:
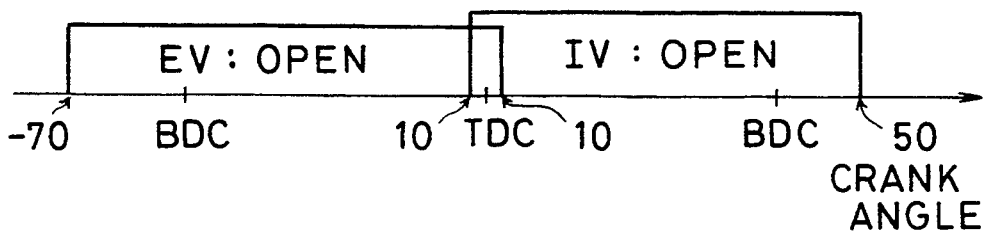
FIG. 21 is a diagram describing the action of the variable valve timing mechanism in a region XI as shown in FIG. 18.

In the region XI, as shown in FIG. 21, the valve timing for opening the exhaust valves 15 and 16 is set at 70 deg (crank angle) before the bottom dead center (BBDC) and the valve timing for closing them is set at 10 deg (crank angle) after the top dead center (ATDC). On the other hand, the valve timing for opening the intake valves 13 and 14 is set at 10 deg (crank angle) before the top dead center (BTDC) and the valve timing for closing them is set at 50 deg (crank angle) after the bottom dead center (ABDC).

In summary, the intake valves 13 and 14 are set so as to be delayed in closing in such partially loaded regions. Specifically, in the region I, there is no overlap of the open states of the exhaust valves 15 and 16 with the open states of the intake valves 13 and 14. In other words, the intake valves 13 and 14 are opened after the exhaust valves 15 and 16 have been closed. Alternatively, in this region I, an overlap of the open states of the intake valves 13 and 14 with the open states of the exhaust valves 15 and 16 may be set to be smaller than in the region X and XI, as shown in FIGS. 20 and 21, respectively. In the region X, the overlap of the range of the crank angle, at which the exhaust valves 15 and 16 are open, with the range of the crank angle, at which the intake valves 13 and 14 are open, is larger than the overlap of the open states of the intake valves 13 and 14 with the open states of the exhaust valves 15 and 16 in the region XI. In this region X, the timing for opening the intake valves 13 and 14 is set after top dead center (ATDC). In the region XI, the overlap of the crank angle, at which the exhaust valves 15 and 16 are open, with the crank angle at which the intake valves 13 and 14 are open, is substantially the same as in the region X.

The foregoing description can be briefed as follows:
(1) Region I (with the low load of the engine and the low number of rotation of the engine): the overlap is zero or smaller than the other regions and the closing of the intake valves is delayed.
(2) Region X (with the load of the engine smaller than two thirds of the entire load): the overlap is larger than that in the region XI and the closing of the intake valves is delayed. The timing for opening the intake valves and the timing for closing the exhaust valves are set after top dead center (ATDC).
(3) Region XI (with the load of the engine larger than two thirds of the entire load): the overlap is smaller than that in the region X. The timing for overlapping and the timing for closing the intake valves are substantially the same as conventional ones.

Control of EGR

Figure 22:
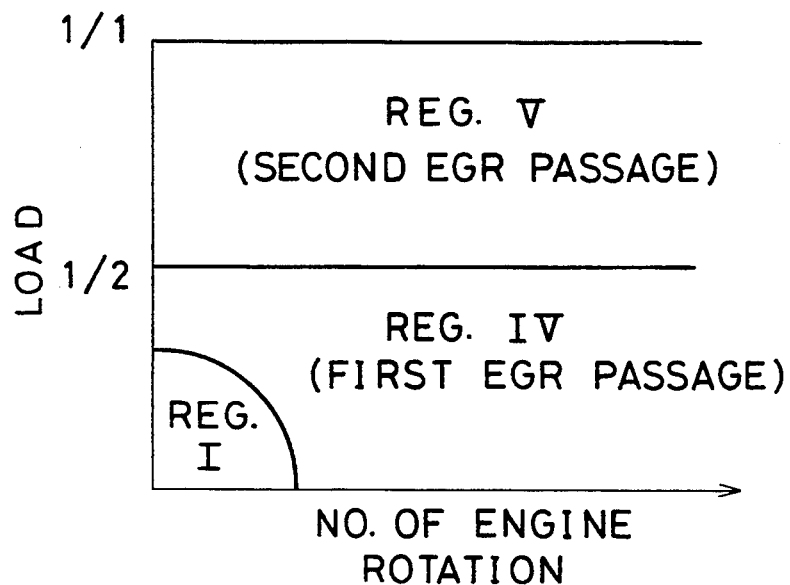
FIG. 22 is a control map for controlling the recirculation of exhaust gases (EGR) according to the second embodiment of the present invention.

The control of the recirculation of exhaust gases (EGR) is performed in three regions, i.e. region I, IV, and V, on the basis of the map as indicated in FIG. 22 by controlling the first EGR valve 67 and the second EGR valve 73 in a fashion as will be described hereinafter.

Region I: This region is a region wherein the load of the engine is low and the number of rotation of the engine is low, as have been described hereinabove.

In this region I, both of the first and second EGR valves 67 and 73 are closed to full extent.

Region IV: This region is a region wherein the load of the engine is smaller than a half of the full load.

In the region IV, the rate of the exhaust gases to be recirculated is adjusted by opening the first EGR valve 67 while the second EGR valve 73 is closed. In other words, the exhaust gases are recirculated through the first outer EGR passage 65.

Region V: This region is a region in which the load of the engine is over a half of the full load, including the entire range up to the full load.

In the region V, the rate of the exhaust gases to be recirculated is adjusted by opening the second EGR valve 73 while the first EGR valve 67 is closed. In other words, the exhaust gases are recirculated through the second outer EGR passage 66 with the EGR cooler 72. Further, in this region, the rate of the exhaust gases to be recirculated is so arranged as to be constant or to be increased as the load becomes larger.

Figure 23:
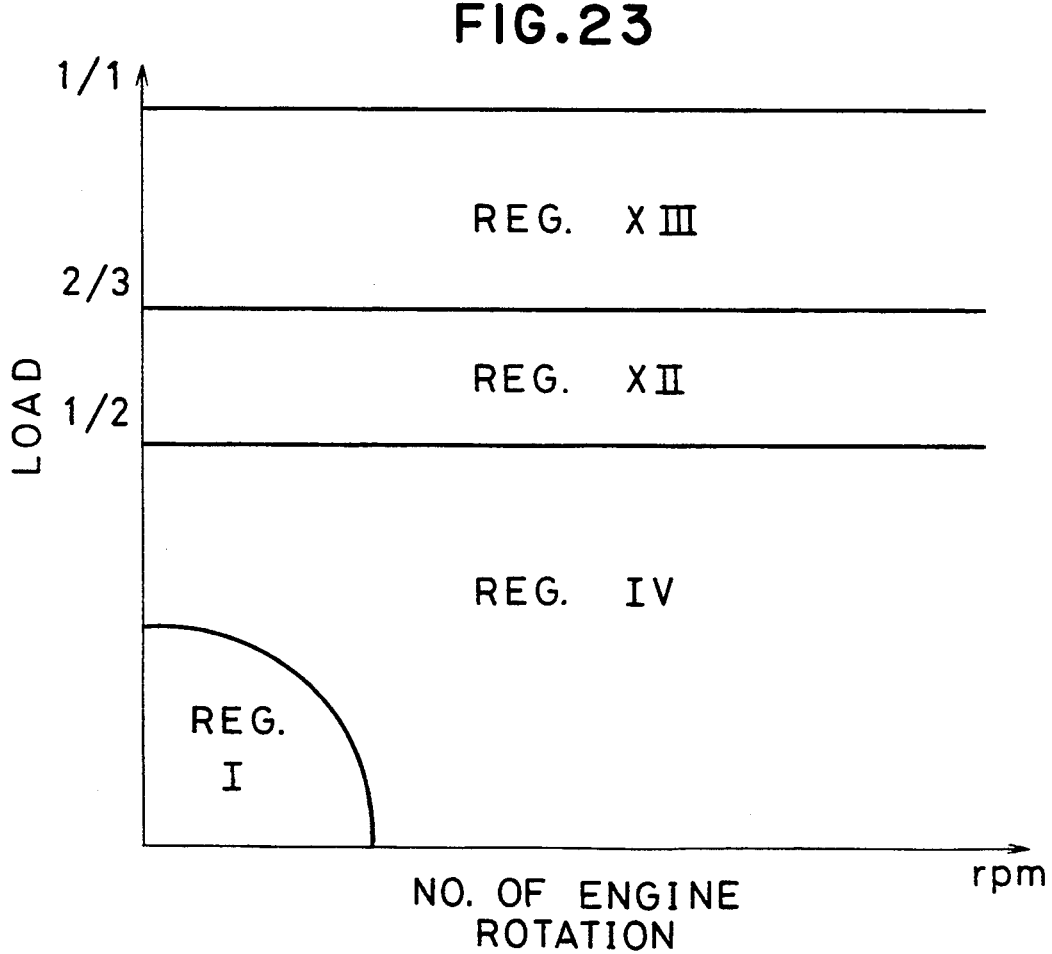
FIG. 23 is a control map in which the control of the variable valve timing mechanism is combined with the control of the recirculation of the exhaust gases (EGR) according to the second embodiment of the present invention.
Figure 24:
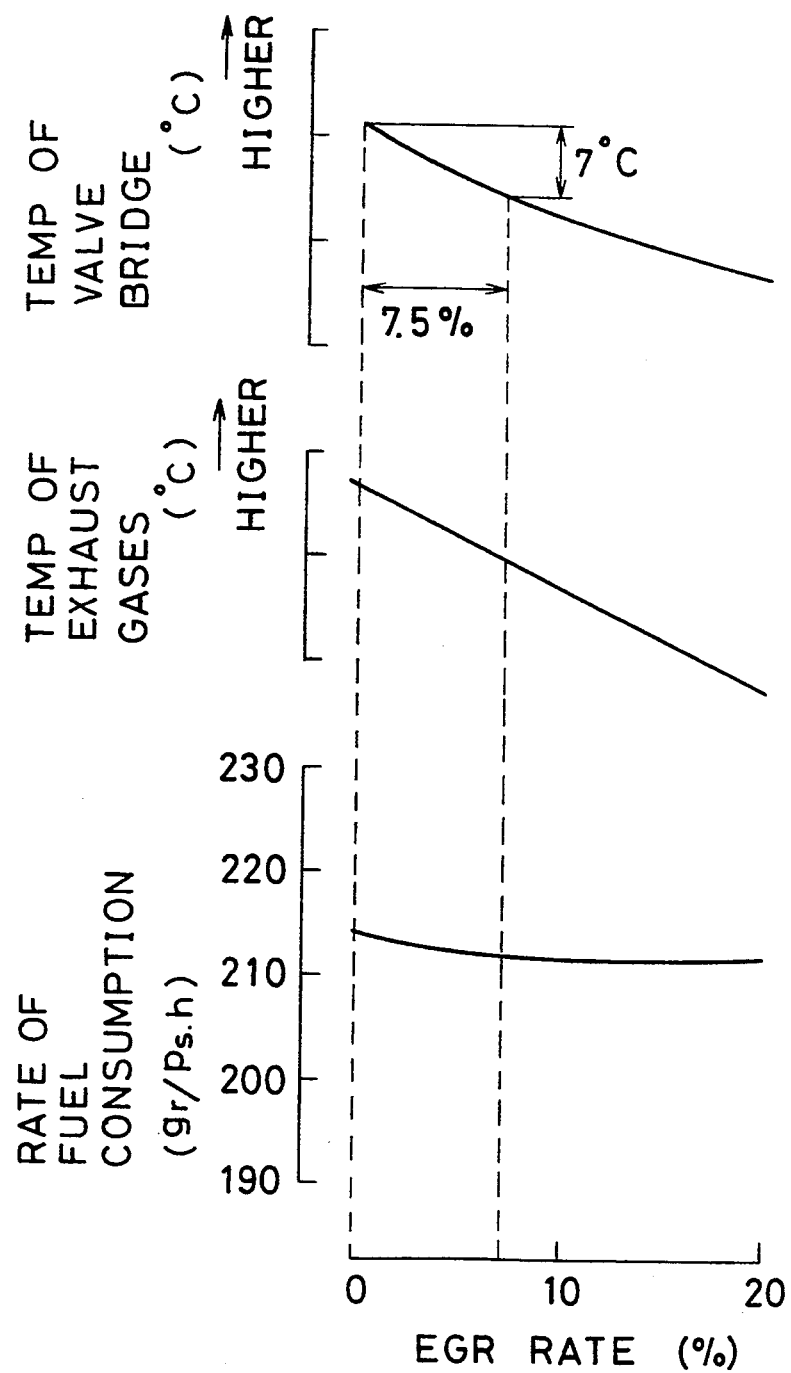
FIG. 24 is a graph showing the relationship between the temperature at the valve bridge, etc. and the EGR ratios. The temperature of the exhaust gases recirculated was approximately 100° C.
Figure 25:
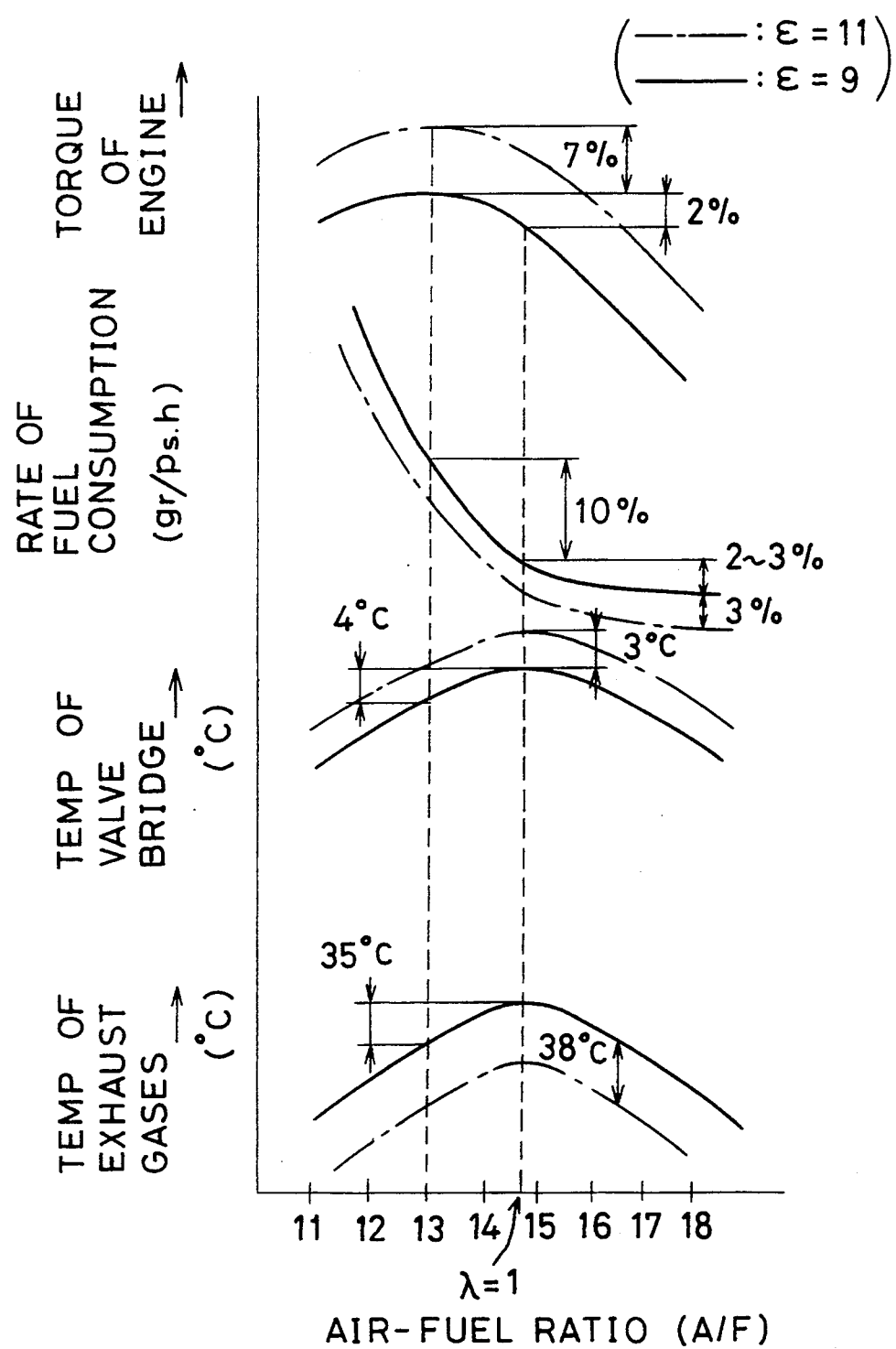
FIG. 25 is a graph showing the relationship between the temperature at the valve bridge, etc. and the air-fuel ratios.

It is to be noted that FIG. 23 is prepared by a combination of FIG. 18 indicative of the control of the valve timing with FIG. 22 indicative of the control of the EGR. In FIG. 23, the region is divided into four regions, I, VI, XII and XIII. A detailed description will be made of the regions I, VI and XIII, where the problems arise with stability in combustion, fuel economy or knocking. The engine is controlled in these regions in such a manner as will be described hereinafter.

Region I: This region is an extremely light load region, or a low load and low rotational region. In this region, combustion is likely to become unstable.

In this region, the outer EGR via the outer EGR passages is inhibited and there is no overlap or a smaller overlap between the open states of the exhaust valves 15 and 16 with the open states of the intake valves 13 and 14. Hence, the amount of the exhaust gases which are left in the combustion chamber 8 is so small that the stability in combustion can be ensured. Further, as the angle at which the throttle valve 44 is open is small in the region I, the closing of the intake valves 13 and 14 is delayed, so that a loss in pumping can be reduced.

Region VI: This region is a light load region where the load of the engine is lower than a half of the full load.

In the region VI, the combustion is relatively stable, so that an overlap of the range of the crank angles at which the exhaust valves 15 and 16 are open with the range of the crank angles at which the intake valves 13 and 14 are open is set to be larger. Hence, the internal EGR is performed in addition to the recirculation of the exhaust gases through the first outer EGR passage 65. In other words, in the region VI, as the overlap of the range in which the exhaust valves 15 and 16 are open with the range in which the intake valves 13 and 14 are open is set so as to become large and the timing for overlapping is set to happen after top dead center (ATDC), the internal EGR is carried out by causing a large amount of the exhaust gases having higher temperatures to be remained in the combustion chamber 8. Further, the exhaust gases to be recirculated through the first outer EGR passage 65 are relatively high in temperature because the exhaust gases withdrawn from the engine are recirculated to the engine through the first outer EGR passage 65 whose upstream end is communicated with the exhaust manifold 61, before they are allowed to become cool. In addition, the closing of the intake valves 13 and 14 is delayed, so that the delay in closing them in combination with the recirculation of the exhaust gases having higher temperatures can reduce a loss in pumping in the region VI.

Region XIII: This region is a high load region that contains the whole range of the load of the engine higher than two thirds of the full load.

In the region XIII, the overlap of the range of the crank angles at which the exhaust valves 15 and 16 are open with the range of the crank angles at which the intake valves 13 and 14 are open is substantially the same as that in the region XII. The timing for overlapping is set as in conventional cases, and the timing for overlapping starts before the top dead center (BTDC) and ends after the top dead center (ATDC). The timing for closing the intake valves is so conventional that air can be filled in the combustion chamber in an appropriate way. In addition, in the region XIII, the exhaust gases are allowed to cool with the second outer EGR passage 66 with the EGR cooler 72 and then recirculated, i.e. a so-called cold EGR is performed, thereby suppressing the temperature within the cylinder from elevating. In the region XIII, the temperature within the cylinder can be lowered in the way as described hereinabove by means of scavenging, delaying the closing of the intake valves 13 and 14, and performing the cold EGR, so that the valve bridge portions can be protected from heat load, an occurrence of knocking can be suppressed, and the amount of NOx within the exhaust gases can be decreased in the region XIII.

Control of Air-Fuel Ratio

The main body 1 of the engine is subjected to feedback control so as for the air-fuel ratio of the mixed fuel to become stoichiometric ($\lambda = 1$) in a wide region containing the high load region XIII (containing the full open load), as shown in FIG. 23.

In the second embodiment, the higher compression ratio of the engine is effective for enhancing reliability of the engine particularly in the full open load region. In other words, it is possible to improve reliability of the engine by suppressing the temperature within the engine from elevating with the aid of the exhaust gases, when the air-fuel ratio is made leaner than conventional ones to the stoichiometric air-fuel ratio in the high load region. It can be noted herein as a matter of course that the amount of NOx within the exhaust gases can be reduced. Furthermore, the rate of the amount of the fuel to be consumed can be improved to a great extent by making the air-fuel ratio stoichiometric in the high load region.

It can be noted herein that both of the first and second embodiments according to the present invention contains not only the instance where the air-fuel ratio of the mixed fuel is so controlled as to become a strictly stoichiometric air-fuel ratio in the running state under high load conditions, but the instance where the air-fuel ratio thereof is so controlled as to become a substantially stoichiometric air-fuel ratio. In this case, the term "substantially stoichiometric" is intended to mean that the air-fuel ratio is leaner than the conventional one ($A/F = 13$) or the air-fuel ratio is equal to or lower than $A/F = 16$ in which the temperature within the engine becomes higher than the conventional ones.

Control of EGR in High Load Region

A detailed description will ba made of a preferred example of the control of the recirculation of exhaust gases (EGR) in the high load region as indicated by the region V in FIGS. 9 and 22.

In the region V, the recirculation of the exhaust gases is so controlled as making the EGR rate constant or increasing the EGR rate as the load becomes larger. This control of the EGR is so adapted as to suppress the temperature within the engine from elevating or the temperature of the exhaust gases from elevating. It can be noted herein that the exhaust gases in the region V are recirculated through the second outside EGR passage 66 in the manner as described hereinabove, as shown in FIGS. 3 and 17.

Figure 17:
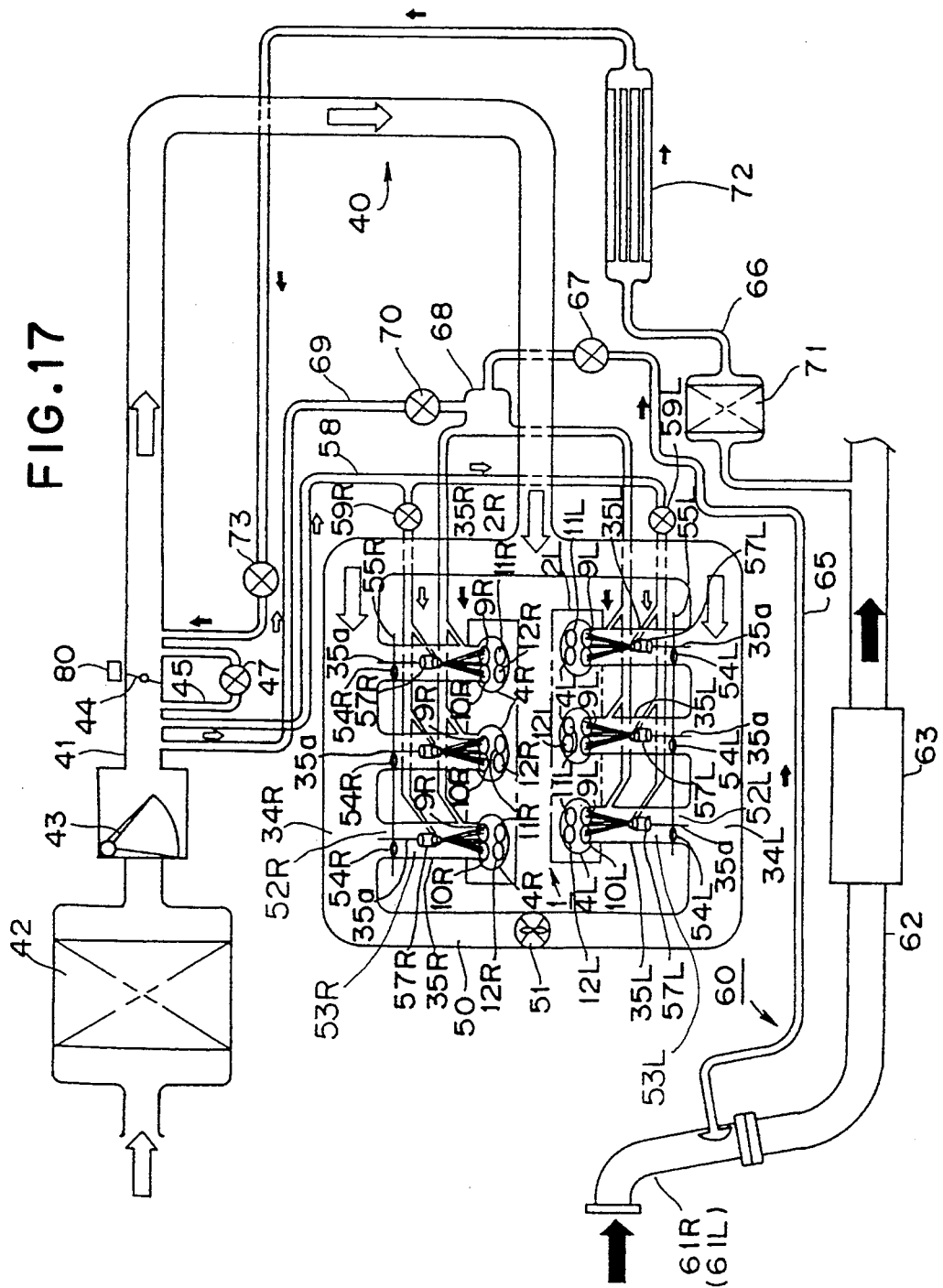
FIG. 17 is a schematic representation showing an intake system and an exhaust system of the internal combustion engine according to the second embodiment of the present invention.

For the internal combustion engine without any supercharger as shown in FIG. 17, the EGR control valve 73 is so arranged as for its angle of opening to become larger in accordance with an increase in the load. More specifically, as shown qualitatively in FIG. 26, the rate of the exhaust gases to be recirculated for the outside EGR becomes larger as the load is made higher. Further, this outside EGR is performed by controlling the angle of the opening of the EGR control valve 73, with the inside EGR taken into account.

Figure 26:
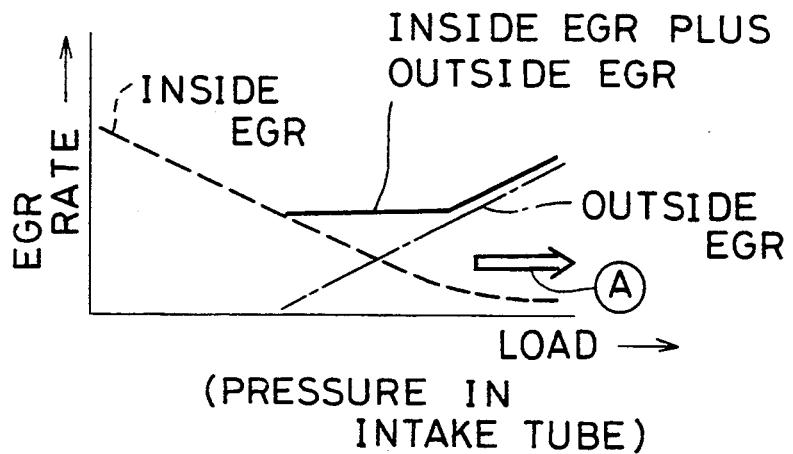
FIG. 26 is a graph showing the quantitative contents of the preferred control of the EGR for the engines in a natural intake system.

In other words, as shown in FIG. 26, the larger the load of the engine, that is, the larger the amount of fresh air to be filled, the smaller there is the tendency that the rate of the internal recirculation of the exhaust gases is decreased. It can be noted, however, that, when the inside EGR and outside EGR are summed up, the rate of the EGR becomes constant with respect to the load (as shown in FIG. 26), by controlling the angle of the opening of the EGR control valve 73 so as to become larger as the load of the engine is made larger in the manner as described hereinabove. After the internal recirculation of the exhaust gases has reached the minimum rate (in the full open load region and the region A in the vicinity thereof), the outside EGR is so set as to become larger in accordance with an increase in the rate of the EGR.

It can be noted herein that the control as described hereinabove can avoid an increase in the amount of NOx even if the load would be increased in the region V, because the EGR rate is set so as to become constant with respect to the load. Further, in this region V, the temperature of the exhaust gases can be lowered through recirculation. In addition, the EGR rate is increased in accordance with an increase in the load of the engine in the full open load region and the region A in the vicinity thereof, so that the temperature of the exhaust gases can further be lowered. Hence, the control of the recirculation of the exhaust gases in the region V can ensure reliability of the engine even if the compression ratio of the engine would be made higher.

Figure 27:
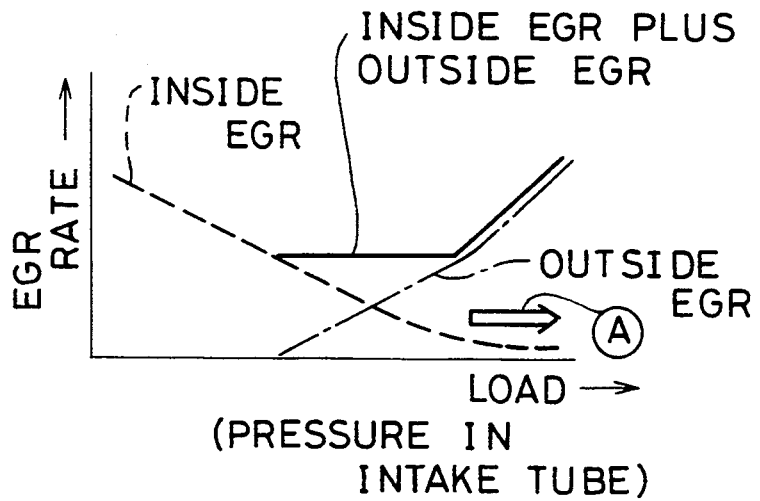
FIG. 27 is a graph showing a variant example of FIG. 26.

FIG. 27 shows a variant of the control of the recirculation of the exhaust gases (EGR). In this embodiment, the rate at which the outside EGR is increased is set to be large in the full open load region and the region A in the vicinity thereof, thereby forcing the temperature of the exhaust gases to be lowered. This variant can suppress the temperature within the engine from elevating in the full open load region and in the region A in the vicinity thereof, where the problem may arise when the compression ratio of the engine is made extremely high.

Figure 28:
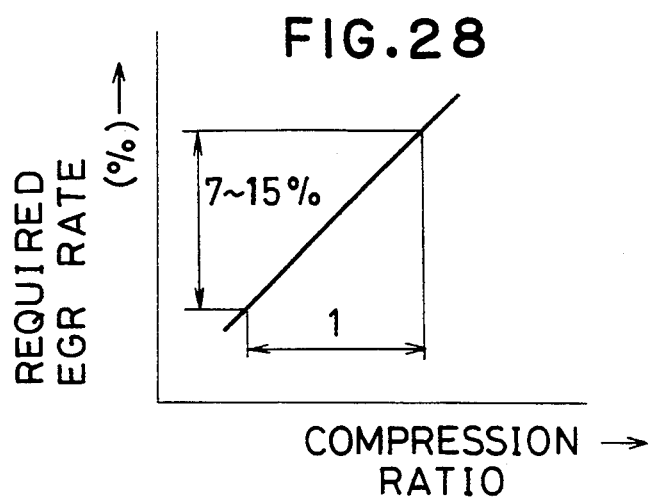
FIG. 28 is a graph showing the relationship between the required EGR rate and the compression ratios, when the compression ratio is increased while the temperature within the engine is held constant.

It can be noted herein that, when the compression ratio is raised to $\epsilon = 1$, the EGR rate required for holding the temperature within the engine (at the valve bridge portions, pistons, etc.) constant in the full open load region and in the region A in the vicinity thereof may range from 7% to 15%, as shown in FIG. 28.

Figure 29:
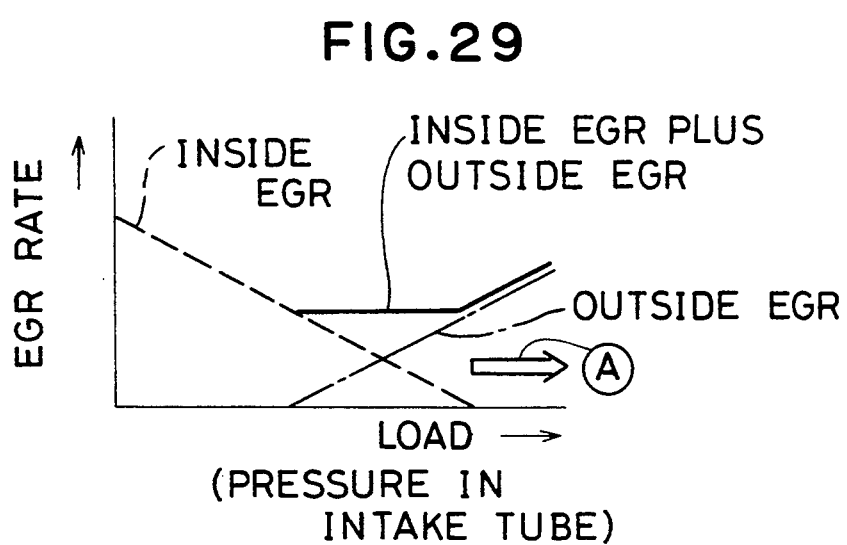
FIG. 29 is a graph showing the qualitative contents of the preferred control of the EGR for a supercharged engine.

On the other hand, in the region V, for the internal combustion engine with the supercharger 32 as shown in FIG. 3, the amount of the exhaust gases (i.e. the rate of the outside EGR) can be set to become larger as the load of the engine is made larger, as shown qualitatively in FIG. 29.

It can be noted herein that the control as described hereinabove can avoid an increase in the amount of NOx even if the load would be increased in the region V, because the EGR rate is set so as to become constant with respect to the load. Further, in this region V, the temperature within the engine and the temperature of the exhaust gases can be lowered through recirculation. In addition, the EGR rate is set so as to be increased in accordance with an increase in the load of the engine in the full open load region and in the region A in the vicinity thereof, so that the temperature within the engine and the temperature of the exhaust gases can further be lowered. Hence, the control of the recirculation of the exhaust gases in the region V can ensure reliability of the engine even if the pressure to be charged by forcing more air into the engine would be made higher. Particularly in the full open load region and in the region A in the vicinity thereof, the elevation of the temperature within the engine can be suppressed.

It can further be noted herein that, although the period of time during which the open states of the intake valves 13 and 14 overlap with the open states of the exhaust valves 15 and 16 is set large in the region V, it is possible to set the period of time as short as, for example, in the case as shown in FIG. 7.

Figure 30:
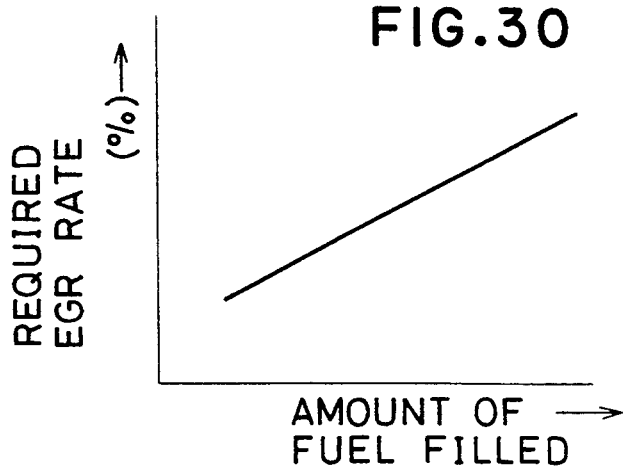
FIG. 30 is a graph showing the relationship between the required EGR rates and the amount of the mixed fuel to be filled, when the pressure elevated by increasing the amount of the mixed fuel, while the temperature within the engine and the temperature of the exhaust gases are held constant.

In addition, when the amount of the fresh air is increased to 1% by raising the pressure to be charged, it can be noted from FIG. 30 that the EGR rate required for holding the temperature within the engine (i.e. at the valve bridge portions, pistons, and the like) or the temperature of the exhaust gases constant in the full open load region and in the region A in the vicinity thereof is found to be in the range of from 0.2% to 0.8%. The EGR rate of 0.2% is required for holding the temperature of the exhaust gases constant, while the EGR rate of 0.8% is required for holding the temperature within the engine constant.

In each of the embodiments according to the present invention as described hereinabove, the internal combustion engine according to the present invention can be arranged in such a manner that a plurality of spark plugs are disposed for each cylinder and those plural spark plugs are ignited at least in the high load region V. Further, the internal combustion engine according to the present invention can be arranged in such a manner that a tumble flow is caused to occur in the combustion chamber, thereby improving a decrease in combustibility and a decrease in a speed of combustion, due to the recirculation of the exhaust gases into the intake system. In addition, the supercharger may be of a turbocharger type.

The present invention is not intended in any manner to be limited to the embodiments as described hereinabove, and it is to be understood that any variations or modifications made so as not to deviate from the basic concepts of the present invention are interpreted as being contained within the spirit of the present invention.

What is claimed is:

1. An internal combustion engine of a spark ignition type, having a detector means for detecting a load of the engine, said internal combustion engine comprising:
   a control means for controlling an amount of fuel so as to make an air-fuel ratio of a mixed fuel to be charged into the engine substantially stoichiometric in a high load region in which the load of the engine detected by the detector means is equal to or larger than a predetermined value, in response to a signal from the detector means; and
   a recirculation means for recirculating exhaust gases from the engine into an intake system in the high load region, in response to the signal from the detector means.

2. An internal combustion engine of a spark ignition type as claimed in claim 1, wherein the air-fuel ratio of the mixed fuel at the time of running in the high load region is leaner than A/F=13.

3. An internal combustion engine of a spark ignition type as claimed in claim 2, wherein the air-fuel ratio of the mixed fuel at the time of running in the high load is richer than A/F=16.

4. An internal combustion engine of a spark ignition type as claimed in claim 1, wherein the exhaust gases are recirculated into the intake system of the engine by the recirculation means at the time of a full load.

5. An internal combustion engine of a spark ignition type as claimed in claim 1, wherein;
   the recirculation means has a first cooler means disposed in an EGR gas passage connecting an exhaust system with the intake system of the engine; and
   wherein the exhaust gases to be recirculated into the intake system of the engine at the time of running in the high load region are cooled by the first cooler means.

6. An internal combustion engine of a spark ignition type as claimed in claim 5, further comprising a supercharger for charging the engine with intake air;
   wherein a second cooler means is provided in the intake system on the downstream side of the supercharger;
   wherein a downstream end of the EGR gas passage has an opening so as to be communicated with the intake system on the upstream side of the second cooler means; and
   wherein the exhaust gases to be recirculated into the intake system are cooled by the first cooler means and the second cooler means.

7. An internal combustion engine of a spark ignition type as claimed in claim 5, wherein the exhaust gases having a high temperature are recirculated into the intake system by bypassing the cooler means at the time of running in a low load region wherein the load of the engine is lower than the predetermined value.

8. An internal combustion engine of a spark ignition type as claimed in claim 7, wherein the recirculation of the exhaust gases into the intake system is inhibited at the time of running in a low load and low rotational region wherein the engine is running at least in an idling state.

9. An internal combustion engine of a spark ignition type as claimed in claim 1, wherein the compression ratio of the engine is increased.

10. An internal combustion engine of a spark ignition type as claimed in claim 9, wherein:
    the engine is an internal combustion engine of a natural intake system having no supercharger; and
    the compression ratio is set to 11 or higher.

11. An internal combustion engine of a spark ignition type as claimed in claim 9, wherein:
    the engine is an internal combustion engine of a supercharging type, with a supercharger equipped for charging the engine with intake air; and
    the compression ratio is set to 9 or higher.

12. An internal combustion engine of a spark ignition type as claimed in claim 11, wherein the supercharger is of a type driven mechanically by the engine.

13. An internal combustion engine of a spark ignition type as claimed in claim 1, wherein a rate at which the exhaust gases are to be recirculated is set to at least one of becoming constant and being increased as a load increases, at the time of running in the high load region.

14. An internal combustion engine of a spark ignition type as claimed in claim 1, further comprising a variable valve timing mechanism for changing a timing for opening and closing an intake valve and an exhaust valve in accordance with a running state of the engine.

15. An internal combustion engine of a spark ignition type as claimed in claim 14, wherein:

the engine is an internal combustion engine of a supercharging type, with an supercharger equipped for charging the engine with intake air;

a running region in which the engine is running is divided into a first region, a second region, and a third region;

wherein, in the first region which is a high rotational region in which the number of rotation of the engine is equal to or higher than a predetermined value, the variable valve timing mechanism is arranged to set an overlap of an open state of the exhaust valve in which the exhaust valve is opened with an open state of the intake valve in which the intake valve is opened so as to become larger than those in the second region and in the third region and to delay the closing of the intake valve at a timing late enough after bottom dead center;

wherein, in the second region in which the number of rotation of the engine is so low and the load is so low as containing at least an idling running state of the engine, the variable valve timing mechanism is arranged to set an overlap of the open state of the exhaust valve with the open state of the intake valve so as to become smaller than those in the first region and in the third region and to delay the closing of the intake valve at a timing sufficiently later than the timing at which the intake valve is closed in the first region; and wherein, in the third region, the variable valve timing mechanism is arranged to set an overlap of the open state of the exhaust valve with the open state of the intake valve so as to become smaller than that in the first region yet larger than that in the second region and to set the timing of closing the intake valve to be substantially the same as the timing of closing the intake valve in the first region.

16. An internal combustion engine of a spark ignition type as claimed in claim 8, further comprising a variable valve timing mechanism for changing a timing for opening and closing an intake valve and an exhaust valve in accordance with a running state of the engine;

wherein the engine is an internal combustion engine of a supercharging type with a supercharger equipped for charging the engine with intake air; and a running region in which the engine is running is divided into a first region, a second region, and a third region;

wherein, in the first region which is a high rotational region in which the number of rotation of the engine is equal to or higher than a predetermined value, the variable valve timing mechanism is arranged to set an overlap of an open state of the exhaust valve in which the exhaust valve is opened with an open state of the intake valve in which the intake valve is opened so as to become larger than those in the second region and in the third region and to delay the closing of the intake valve at a timing late enough after bottom dead center;

wherein, in the second region in which the number of rotation of the engine is so low and the load is so low as containing at least an idling running state of the engine, the variable valve timing mechanism is arranged to set an overlap of the open state of the exhaust valve with the open state of the intake valve so as to become smaller than those in the first region and in the third region and to delay the closing of the intake valve at a timing later than the timing at which the intake valve is closed in the first region; and wherein, in the third region, the variable valve timing mechanism is arranged to set an overlap of the open state of the exhaust valve with the open state of the intake valve so as to become smaller than that in the first region yet larger than that in the second region and to set the timing of closing the intake valve to be substantially the same as the timing of closing the intake valve in the first region.

17. An internal combustion engine of a spark ignition type as claimed in claim 14, wherein:

the engine is an internal combustion engine of a natural intake type, without a supercharger for charging the engine with intake air; and a running region in which the engine is running is divided into a first region, a second region, and a third region;

wherein, in the first region in which a load is equal to or higher than a predetermined second value, the variable valve timing mechanism is arranged so as to set a predetermined range containing top dead center, in which an open state of the exhaust valve in which the exhaust valve is opened overlaps with an open state of the intake valve in which the intake valve is opened;

wherein, in the second region in which the number of rotation of the engine is so low and the load is so low as containing at least an idling running state of the engine, the variable valve timing mechanism is arranged to open the intake valve so as not to overlap with a timing for closing the exhaust valve and to delay the closing of the intake valve at a timing late enough after bottom dead center; and wherein, in the third region, the variable valve timing mechanism is arranged to set an overlap of the open state of the exhaust valve with the open state of the intake valve so as to become substantially the same as that in the first region and so as to open the intake valve after top dead center and to delay a timing for closing the intake valve at substantially the same timing as the timing for closing the intake valve in the second region.

18. An internal combustion engine of a spark ignition type as claimed in claim 17, wherein the predetermined second value is set on the side higher than said predetermined load.

19. An internal combustion engine of a spark ignition type as claimed in claim 7, further comprising a variable valve timing mechanism for changing a timing for opening and closing the intake valve and the exhaust valve in accordance with a running state of the engine;

wherein the engine is an internal combustion engine of a natural intake type, without a supercharger for charging the engine with intake air; and a running region in which the engine is running is divided into a first region, a second region, and a third region;

wherein, in the first region which is a high load region wherein the load of the engine is equal to or higher than the predetermined second value, the variable valve timing mechanism is arranged so as to set a predetermined range containing top dead center, in which an open state of the exhaust valve in which the exhaust valve is opened overlaps with an open state of the intake valve in which the intake valve is opened;

wherein, in the second region which is a low load and low rotational region containing an idling running state of the engine, the variable valve timing mechanism is arranged to open the intake valve so as not to overlap with a timing for closing the exhaust valve and to delay the closing of the intake valve at a timing late enough after bottom dead center; and wherein, in the third region, the variable valve timing mechanism is arranged to set an overlap of the open state of the exhaust valve with the open state of the intake valve so as to become substantially the same as that in the first region and so as to open the intake valve after top dead center and to delay a timing for closing the intake valve at substantially the same timing as the timing for closing the intake valve in the second region.

20. An internal combustion engine of a spark ignition type as claimed in claim 1, wherein a rate at which exhaust gases are to be recirculated is set to be increased as a load increases, at time of running in the high load region.

21. An internal combustion engine of a spark ignition type as claimed in claim 1, wherein the high load region, in which the air fuel ratio is substantially stoichiometric and the exhaust gas is recirculated into the intake system, contains a full load region.

22. An internal combustion engine of a spark ignition type as claimed in claim 1, further comprising a supercharger provided in an intake passage of the engine for charging the engine with intake air, wherein the recirculation means has an outlet port to the intake passage which is located in a position upstream of the supercharger.

23. An internal combustion engine of a spark ignition type as claimed in claim 13, wherein the high load region, in which the air-fuel ratio is substantially stoichiometric and the exhaust gas is recirculated into the intake system, contains a full load region.

24. An internal combustion engine of a spark ignition type as claimed in claim 13, further comprising a supercharger provided in an intake passage of the engine for charging the engine with intake air, wherein the recirculation means has an outlet port to the intake passage which is located in a position upstream of the supercharger.

25. An internal combustion engine of a spark ignition type as claimed in claim 13, wherein the air-fuel ratio of the mixed fuel at the time of running in the high load region is richer than $A/F=16$.

26. An internal combustion engine of a spark ignition type, having a detector means for detecting a load of the engine, said internal combustion engine comprising:

a control means for controlling an amount of fuel so as to make an air-fuel ratio of a mixed fuel to be charged into the engine substantially stoichiometric in a high load region in which the load of the engine detected by the detector means is equal to or larger than a predetermined value, in response to a signal from the detector means;

a recirculation means for recirculating exhaust gases from the engine into an intake system in the high load region, in response to the signal from the detector means; and wherein a rate at which the exhaust gases are to be recirculated is set to be at least one of constant and increased as a load increases, at the time of running in the high load region.

27. An internal combustion engine of a spark ignition type, having a detector means for detecting a load of the engine, said internal combustion engine comprising:

a recirculation means for recirculating exhaust gases from the engine into an intake system in a high load region, in which the load of the engine detected by the detector means is equal to or larger than a predetermined value, in response to a signal from the detector means;

wherein a rate at which the exhaust gases are to be recirculated is set to be at least one of constant and increased as a load increases, at the time of running in the high load region.

* * * * *